(12) United States Patent
Lasser

(10) Patent No.: US 11,005,878 B1
(45) Date of Patent: *May 11, 2021

(54) COOPERATION BETWEEN RECONNAISSANCE AGENTS IN PENETRATION TESTING CAMPAIGNS

(71) Applicant: XM Cyber Ltd., Hertzelia (IL)

(72) Inventor: Menahem Lasser, Kohav-Yair (IL)

(73) Assignee: XM Cyber Ltd., Hertzelia (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/931,276

(22) Filed: Jul. 16, 2020

Related U.S. Application Data

(60) Provisional application No. 62/931,964, filed on Nov. 7, 2019.

(51) Int. Cl.
*H04L 29/06* (2006.01)
*H04L 12/26* (2006.01)
*G06F 9/30* (2018.01)

(52) U.S. Cl.
CPC ...... *H04L 63/1433* (2013.01); *G06F 9/30029* (2013.01); *H04L 43/06* (2013.01)

(58) Field of Classification Search
CPC .................................................. H04L 43/06
USPC .......................................................... 726/25
See application file for complete search history.

(56) References Cited

U.S. PATENT DOCUMENTS

| | | | |
|---|---|---|---|
| 6,574,737 B1 | 6/2003 | Kingsford et al. | |
| 6,711,127 B1 | 3/2004 | Gorman et al. | |
| 6,918,038 B1 | 7/2005 | Smith et al. | |
| 6,952,779 B1 | 10/2005 | Cohen et al. | |
| 7,013,395 B1 | 3/2006 | Swiler et al. | |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

Tidjon et al., "Intrusion Detection Systems: A Cross-Domain Overview", IEEE Communications Surveys & Tutorials, vol. 21, No. 4, Fourth Quarter 2019, pp. 3639-3681. (Year: 2019).*

(Continued)

*Primary Examiner* — Khalil Naghdali
(74) *Attorney, Agent, or Firm* — Momentum IP; Marc Van Dyke

(57) ABSTRACT

Methods and systems are disclosed for carrying out penetration testing campaigns of a networked system. These include having a reconnaissance agent software module (RASM) installed on a first network node detect an occurrence of a risky event in the node, an event that would allow an attacker of the penetration testing campaign to compromise the node if a specific Boolean condition is satisfied; in response to detecting the risky event, the RASM sends queries to a second network node requesting information, receives answers to the queries including at least one or more portions of the requested information, and, based on the received information, determines that the specific Boolean condition is satisfied and concludes that the node could be compromised by the attacker of the penetration testing campaign. Based on the above, a security vulnerability may be reported.

20 Claims, 20 Drawing Sheets

(56) References Cited

U.S. PATENT DOCUMENTS

| | | |
|---|---|---|
| 7,296,092 B2 | 11/2007 | Nguyen |
| 7,693,810 B2 | 4/2010 | Donoho et al. |
| 7,757,293 B2 | 7/2010 | Caceres et al. |
| 7,926,113 B1 | 4/2011 | Gula et al. |
| 7,934,254 B2 | 4/2011 | Graham |
| 7,966,659 B1 | 6/2011 | Wilkinson et al. |
| 8,001,589 B2 | 8/2011 | Ormazabal et al. |
| 8,112,016 B2 | 2/2012 | Matsumoto et al. |
| 8,127,359 B2 | 2/2012 | Kelekar |
| 8,321,944 B1 | 11/2012 | Mayer et al. |
| 8,356,353 B2 | 1/2013 | Futoransky et al. |
| 8,365,289 B2 | 1/2013 | Russ et al. |
| 8,392,997 B2 | 3/2013 | Chen et al. |
| 8,490,193 B2 | 7/2013 | Sarraute Yamada et al. |
| 8,490,196 B2 | 7/2013 | Lucangeli Obes et al. |
| 8,650,651 B2 | 2/2014 | Podjarny et al. |
| 8,752,183 B1 | 6/2014 | Heiderich et al. |
| 8,813,235 B2 | 8/2014 | Sidagni |
| 8,844,041 B1 | 9/2014 | Kienzle et al. |
| 9,015,301 B2 | 4/2015 | Redlich et al. |
| 9,015,847 B1 | 4/2015 | Kaplan et al. |
| 9,076,013 B1 | 7/2015 | Bailey, Jr. et al. |
| 9,100,430 B1 | 8/2015 | Seiver et al. |
| 9,183,397 B2 | 11/2015 | Futoransky et al. |
| 9,215,245 B1 | 12/2015 | Rajab et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,412,073 B2 | 8/2016 | Brandt et al. |
| 9,467,467 B2 | 10/2016 | Alamuri |
| 9,473,522 B1 | 10/2016 | Kotler et al. |
| 9,558,355 B2 | 1/2017 | Madou et al. |
| 9,760,716 B1 | 9/2017 | Mulchandani |
| 9,781,160 B1 | 10/2017 | Irimie et al. |
| 9,800,603 B1 | 10/2017 | Sidagni |
| 9,824,222 B1 | 11/2017 | Kaplan et al. |
| 9,870,715 B2 | 1/2018 | Sadeh-Koniecpol et al. |
| 9,894,090 B2 | 2/2018 | Hebert et al. |
| 9,912,687 B1 | 3/2018 | Wescoe et al. |
| 10,038,711 B1 | 7/2018 | Gorodissky et al. |
| 10,068,095 B1 | 9/2018 | Segal et al. |
| 10,108,803 B2 | 10/2018 | Chari et al. |
| 10,122,750 B2 | 11/2018 | Gorodissky et al. |
| 10,182,040 B2 | 1/2019 | Hu et al. |
| 10,257,220 B2 | 4/2019 | Gorodissky et al. |
| 10,291,643 B2 | 5/2019 | Marquez et al. |
| 10,367,846 B2 | 7/2019 | Gorodissky et al. |
| 10,382,473 B1 | 8/2019 | Ashkenazy et al. |
| 10,412,112 B2 | 9/2019 | Ashkenazy et al. |
| 10,440,044 B1 | 10/2019 | Zini et al. |
| 10,447,721 B2 | 10/2019 | Lasser |
| 10,454,966 B2 | 10/2019 | Gorodissky et al. |
| 10,462,177 B1 | 10/2019 | Lasser et al. |
| 10,469,521 B1 | 11/2019 | Segal et al. |
| 10,498,803 B1 | 12/2019 | Zini et al. |
| 10,503,911 B2 | 12/2019 | Chari et al. |
| 10,505,969 B2 | 12/2019 | Gorodissky et al. |
| 10,534,917 B2 | 1/2020 | Segal |
| 10,574,684 B2 | 2/2020 | Segal et al. |
| 10,574,687 B1 | 2/2020 | Lasser |
| 10,581,895 B2 | 3/2020 | Ashkenazy et al. |
| 10,637,882 B2 | 4/2020 | Gorodissky et al. |
| 10,637,883 B1 | 4/2020 | Segal et al. |
| 10,645,113 B2 | 5/2020 | Gorodissky et al. |
| 10,652,269 B1 | 5/2020 | Segal et al. |
| 10,686,822 B2 | 6/2020 | Segal |
| 10,686,823 B2 | 6/2020 | Gorodissky et al. |
| 2002/0066034 A1* | 5/2002 | Schlossberg .......... G06F 21/552 726/23 |
| 2003/0140223 A1 | 7/2003 | Desideri |
| 2003/0195861 A1 | 10/2003 | McClure et al. |
| 2003/0208616 A1 | 11/2003 | Laing et al. |
| 2003/0212779 A1 | 11/2003 | Boyter et al. |
| 2003/0217039 A1 | 11/2003 | Kurtz et al. |
| 2004/0015728 A1 | 1/2004 | Cole et al. |
| 2004/0078384 A1 | 4/2004 | Keir et al. |
| 2004/0095907 A1 | 5/2004 | Agee et al. |
| 2005/0086502 A1 | 4/2005 | Rayes et al. |
| 2005/0100157 A1 | 5/2005 | Gray et al. |
| 2005/0102534 A1 | 5/2005 | Wong |
| 2006/0015943 A1 | 1/2006 | Mahieu |
| 2007/0011319 A1 | 1/2007 | McClure et al. |
| 2007/0204347 A1 | 8/2007 | Caceres et al. |
| 2007/0271360 A1 | 11/2007 | Sahita et al. |
| 2008/0092237 A1 | 4/2008 | Yoon et al. |
| 2008/0104702 A1 | 5/2008 | Choi et al. |
| 2008/0172716 A1 | 7/2008 | Talpade et al. |
| 2008/0209567 A1 | 8/2008 | Lockhart et al. |
| 2008/0256638 A1 | 10/2008 | Russ et al. |
| 2008/0288822 A1 | 11/2008 | Wu et al. |
| 2009/0044277 A1 | 2/2009 | Aaron |
| 2009/0049553 A1 | 2/2009 | Vasudeva |
| 2009/0172813 A1 | 7/2009 | Aaron |
| 2010/0138925 A1 | 6/2010 | Barai et al. |
| 2011/0016513 A1 | 1/2011 | Bailey, Jr. |
| 2011/0035803 A1 | 2/2011 | Lucangeli Obes et al. |
| 2011/0061104 A1 | 3/2011 | Sarraute Yamada et al. |
| 2011/0078507 A1 | 3/2011 | Choi et al. |
| 2012/0174228 A1 | 7/2012 | Giakouminakis et al. |
| 2012/0255022 A1 | 10/2012 | Ocepek et al. |
| 2013/0014263 A1 | 1/2013 | Porcello et al. |
| 2013/0031635 A1* | 1/2013 | Lotem ................ G06F 21/577 726/25 |
| 2014/0007241 A1 | 1/2014 | Gula et al. |
| 2014/0137257 A1 | 5/2014 | Martinez et al. |
| 2014/0165204 A1 | 6/2014 | Williams et al. |
| 2014/0173739 A1 | 6/2014 | Ahuja et al. |
| 2014/0237606 A1 | 8/2014 | Futoransky et al. |
| 2014/0328423 A1 | 11/2014 | Agee et al. |
| 2015/0058993 A1 | 2/2015 | Choi et al. |
| 2015/0237063 A1 | 8/2015 | Cotton et al. |
| 2016/0034690 A1* | 2/2016 | Kejriwal ............... G06F 21/577 726/25 |
| 2016/0044057 A1 | 2/2016 | Chenette et al. |
| 2016/0134653 A1 | 5/2016 | Vallone et al. |
| 2016/0147635 A1 | 5/2016 | Schwarzmann |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0006055 A1 | 1/2017 | Strom et al. |
| 2017/0013008 A1 | 1/2017 | Carey et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0123925 A1 | 5/2017 | Patnaik et al. |
| 2017/0149816 A1 | 5/2017 | Kelekar |
| 2017/0214701 A1 | 7/2017 | Hasan |
| 2017/0223043 A1 | 8/2017 | Munoz et al. |
| 2017/0279843 A1 | 9/2017 | Schultz et al. |
| 2017/0286690 A1 | 10/2017 | Chari et al. |
| 2017/0373923 A1 | 12/2017 | Kazachkov et al. |
| 2018/0018465 A1 | 1/2018 | Carey et al. |
| 2018/0103052 A1 | 4/2018 | Choudhury et al. |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0330103 A1 | 11/2018 | Chari et al. |
| 2018/0365429 A1 | 12/2018 | Segal |
| 2019/0014141 A1 | 1/2019 | Segal et al. |
| 2019/0036961 A1 | 1/2019 | Gorodissky et al. |
| 2019/0068631 A1 | 2/2019 | Ashkenazy et al. |
| 2019/0081974 A1 | 3/2019 | Lasser |
| 2019/0149572 A1 | 5/2019 | Gorodissky et al. |

(56) References Cited

U.S. PATENT DOCUMENTS

| | | |
|---|---|---|
| 2019/0182270 A1 | 6/2019 | Kim |
| 2019/0182286 A1 | 6/2019 | Zini |
| 2019/0245883 A1 | 8/2019 | Gorodissky et al. |
| 2019/0268369 A1 | 8/2019 | Gorodissky et al. |
| 2019/0312903 A1 | 10/2019 | Zini et al. |
| 2019/0364070 A1 | 11/2019 | Zini et al. |
| 2019/0387015 A1 | 12/2019 | Ashkenazy et al. |
| 2020/0106800 A1 | 4/2020 | Gorodissky et al. |
| 2020/0145449 A1 | 5/2020 | Segal et al. |
| 2020/0153852 A1 | 5/2020 | Segal et al. |
| 2020/0236130 A1 | 7/2020 | Gorodissky et al. |
| 2020/0280577 A1 | 9/2020 | Segal et al. |
| 2020/0296137 A1* | 9/2020 | Crabtree ............ H04L 63/1425 |

FOREIGN PATENT DOCUMENTS

| | | |
|---|---|---|
| CN | 104009881 A | 8/2014 |
| EP | 1559008 A | 8/2005 |
| EP | 3079336 A1 | 10/2016 |
| WO | 0038036 A | 6/2000 |
| WO | 2008054982 A | 5/2008 |
| WO | 2010069587 A | 6/2010 |
| WO | 2013087982 A | 6/2013 |
| WO | 2015111039 A | 7/2015 |
| WO | 2016164844 A | 10/2016 |
| WO | 2018156394 A | 8/2018 |

OTHER PUBLICATIONS

Probst et al., "Automated Evaluation of Network Intrusion Detection Systems in IaaS Clouds", 2015 11th European Dependable Computing Conference, 2015 IEEE (Year: 2015).*

CN103200230 Machine Translation (by EPO and Google)—published Jul. 10, 2013; Li Qianmu.

Authors: Alhomidi and Reed Title: Attack Graph-Based Risk Assessment and Optimisation Approach International Journal of Network Security & Its Applications (IJNSA), vol. 6, No. 3, May 2014.

CN103916384 Machine Translation (by EPO and Google)—published Jul. 9, 2014 Zhong Li.

CN104009881 Machine Translation (by EPO and Google)—published Aug. 27, 2014 Wang Tian.

Goel, Jai Narayan et al. Ensemble Based Approach to Increase Vulnerability Assessment and Penetration Testing Accuracy. 2016 International Conference on Innovation and Challenges in Cyber Security (ICICCS-INBUSH). (Year: 2016).

Zhao, Jianming et al. Penetration Testing Automation Assessment Method Based on Rule Tree. 2015 IEEE International Conference on Cyber Technology in Automation, Control and Intelligent Systems (CYBER). (Year: 2015).

Hudic, Aleksandar et al. Towards a Unified Penetration Testing Taxonomy. 2012 International Conference on Privacy, Security, Risk and Trust and 2012 International Conference on Social Computing. (Year: 2012).

Qiu, Xue et al. Automatic generation algorithm of penetration graph in penetration testing. 2014 Ninth International Conference on P2P, Parallel, Grid, Cloud and Internet Computing. (Year: 2014).

Hemanidhi, Aniwat et al. Network Risk Evaluation from Security Metric of Vulnerability Detection Tools. TENCON 2014-2014 IEEE Region 10 Conference. (Year: 2014).

Bechtsoudis, A; Sklavos, N. Aiming at Higher Network Security Through Extensive Penetration Tests. IEEE Latin America Transactions vol. 10, Issue: 3. (Year: 2012).

* cited by examiner

```
┌─────────────────────────────────────────────────────────────────────────┐
│ Detect S01 by the RASM installed on a first network node of the at least some network │
│ nodes, an occurrence of a risky event in the first network node, the risky event being an │
│ event that would allow an attacker of the penetration testing campaign to compromise │
│       the first network node if a specific Boolean condition is satisfied           │
└─────────────────────────────────────────────────────────────────────────┘
                                    │
                                    ▼
┌─────────────────────────────────────────────────────────────────────────┐
│ Send S02, by the RASM installed on the first network node, one or more queries to a │
│  second network node of the at least some network nodes, the one or more queries   │
│  requesting information that is relevant for determining a value of the specific Boolean │
│                                  condition,                              │
└─────────────────────────────────────────────────────────────────────────┘
                                    │
                                    ▼
┌─────────────────────────────────────────────────────────────────────────┐
│    Receive S03 by the RASM installed on the first network node and from the RASM   │
│ installed on the second network node, one or more answers to the one or more queries, │
│    the one or more answers including at least a portion of the requested information │
└─────────────────────────────────────────────────────────────────────────┘
                                    │
                                    ▼
┌─────────────────────────────────────────────────────────────────────────┐
│     Determine S04, by the RASM installed on the first network node and based on the │
│    received at least a portion of the requested information, that the specific Boolean │
│  condition is satisfied and conclude that the first network node could be compromised by │
│               the attacker of the penetration testing campaign                      │
└─────────────────────────────────────────────────────────────────────────┘
                                    │
                                    ▼
┌─────────────────────────────────────────────────────────────────────────┐
│    Send S05 , by the RASM installed on the first network node, a message to the remote │
│    computing device, the message notifying the remote computing device that the first │
│     network node could be compromised by the attacker of the penetration testing     │
│                                  campaign                                │
└─────────────────────────────────────────────────────────────────────────┘
                                    │
                                    ▼
┌─────────────────────────────────────────────────────────────────────────┐
│   Determine S06, by the PTSM, a method for the attacker of the penetration testing   │
│    campaign to compromise the networked system, the method to compromise the        │
│    networked system comprising a step of compromising the first network node        │
└─────────────────────────────────────────────────────────────────────────┘
                                    │
                                    ▼
┌─────────────────────────────────────────────────────────────────────────┐
│  Report S07 by the PTSM, at least one security vulnerability of the networked system │
│     determined to exist based on results of the carrying out of the penetration testing │
│  campaign, wherein the reporting comprises performing at least one operation selected │
│   from the group consisting of: (i) causing a display device to display a report containing │
│    information about the at least one security vulnerability of the networked system, (ii) │
│    storing the report containing information about the at least one security vulnerability of │
│    the networked system in a file and (iii) electronically transmitting the report containing │
│        information about the at least one security vulnerability of the networked system │
└─────────────────────────────────────────────────────────────────────────┘
```

FIG. 6A

COOPERATION BETWEEN RECONNAISSANCE AGENTS IN PENETRATION TESTING CAMPAIGNS

CROSS-REFERENCE TO RELATED APPLICATIONS

This patent application claims the benefit of U.S. Provisional Patent Application No. 62/931,964 filed on Nov. 7, 2019, which is incorporated herein by reference in its entirety.

FIELD OF THE INVENTION

The present invention relates to systems and methods for penetration testing of networked systems, and especially to penetration testing systems and methods using locally installed instances of a reconnaissance agent software modules configured to communicate with each other and cooperate in determining the compromisability of networked nodes.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause a significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of an attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a reporting function may be implemented, for example, by software executing in the same server that implements the functionality of the attack function, where the server reports the findings of the attack function to an administrator or a CISO of the tested networked system.

All penetration testing systems can be characterized as doing either an "actual attack penetration testing" or as doing a "simulated penetration testing".

An actual attack penetration testing system does its penetration testing by attempting to attack the tested networked system. Such a system accesses the tested networked system during the test and is not limiting itself to simulation or evaluation. This includes verifying that the tested networked system can be compromised by actively attempting to compromise it and then checking if it was indeed compromised. This implies that a possible side-effect of executing an actual attack penetration test might be the compromising of the tested networked system.

A simulated penetration testing system does its penetration testing while avoiding disturbance to the tested networked system and specifically while avoiding any risk of compromising it. This implies that whenever there is a need to verify that the tested networked system can be compromised by an operation or a sequence of operations, the verification is done by simulating the results of that operation or sequence of operations or by otherwise evaluating them, without taking the risk of compromising the tested networked system.

In the present disclosure, the terms "a compromised node" and "a node known to be compromisable" are synonyms and are used interchangeably. When referring to an actual-attack penetration testing system, both terms mean a node that is already compromised in the current campaign. When referring to a simulated penetration testing system, both terms mean a node that was already determined to be compromisable in the current campaign.

Every penetration testing system operates by iteratively (physically or simulatively) compromising network nodes of the tested networked system. At any iteration during the testing process some of the network nodes of the tested networked system are considered to be already compromised by the potential attacker, and the penetration testing system is attempting to compromise an additional network node (not yet compromised) by utilizing the already-compromised network nodes that are operating under the control of the attacker. Once an additional network node is found to be compromisable, it is added to the group of already-compromised network nodes and a new iteration of the testing begins.

Each such iteration of compromising a new network node includes verifying the success of compromising the new network node under current conditions in the tested networked system. As explained above, in actual attack penetration testing systems the verifying is achieved by actively attempting to compromise the new network node, while in simulated penetration testing systems the verifying is achieved by simulating or evaluating of the compromising step.

SUMMARY OF THE INVENTION

A method is disclosed, according to embodiments, of carrying out, by a simulative penetration testing system, a penetration testing campaign of a networked system, the networked system including multiple network nodes. According to the method, the penetration testing system comprises (A) a penetration testing software module (PTSM) installed on a remote computing device and (B) a reconnaissance agent software module (RASM) installed on at least some network nodes of the multiple network nodes. The method comprises: (a) detecting, by the RASM installed on a first network node of the at least some network nodes, an occurrence of a risky event in the first network node, the risky event being an event that would allow an attacker of the penetration testing campaign to compromise the first network node if a specific Boolean condition is satisfied; (b) sending, by the RASM installed on the first network node, one or more queries to a second network node of the at least some network nodes, the one or more queries requesting information that is relevant for determining a value of the specific Boolean condition; (c) receiving, by the RASM installed on the first network node and from the RASM installed on the second network node, one or more answers to the one or more queries, the one or more answers including at least a portion of the requested information; (d) based on the received at least a portion of the requested information, determining, by the RASM installed on the first network node, that the specific Boolean condition is satisfied and concluding that the first network node could be compromised by the attacker of the penetration testing campaign; (e) sending, by the RASM installed on the first network node, a message to the remote computing device, the message notifying the remote computing device that the first network node could be compromised by the attacker of the penetration testing campaign; (f) determining, by the PTSM, a method for the attacker of the penetration testing campaign to compromise the networked system, the method to compromise the networked system comprising a step of compromising the first network node; and (g) reporting, by the PTSM, at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

In some embodiments, (i) the requested information that is relevant for determining the value of the specific Boolean condition can include information about the respective value of each of one or more variables, where each of the one or more variables is a Boolean variable or a numerical variable; (ii) the received at least a portion of the requested information can include the respective values of at least some of the one or more variables; and (iii) the determining that the specific Boolean condition is satisfied can be based on the received respective values of the at least some of the one or more variables.

In some embodiments, a necessary condition for the specific Boolean condition to be satisfied can be that there is a network node of the multiple network nodes, different from the first network node, that is already known to be compromisable by the attacker of the penetration testing campaign and that can communicate with the first network node.

In some embodiments, a necessary and sufficient condition for the specific Boolean condition to be satisfied can be that there is a network node of the multiple network nodes, different from the first network node, that is already known to be compromisable by the attacker of the penetration testing campaign and that can communicate with the first network node.

In some embodiments, the one or more variables can include a Boolean variable whose value is true if and only if the second network node is already known to be compromisable by the attacker of the penetration testing campaign.

In some embodiments, the one or more variables can consist of a single Boolean variable.

In some embodiments, the one or more variables can include a Boolean variable whose value is true if and only if the second network node has write access rights to a given shared folder.

In some embodiments, the one or more variables can include a variable whose respective value may change during the penetration testing campaign.

In some embodiments, the one or more variables can include a Boolean variable whose value is true if and only if a given removable storage device had been inserted into the second network node during the penetration testing campaign.

In some embodiments, the one or more variables can include a numerical variable whose value indicates a count of occurrences of a given event.

In some embodiments, the one or more queries can consist of a single query which is requesting information about the respective values of multiple variables of the one or more variables.

In some embodiments, the one or more queries can consist of multiple queries, where each query of the multiple queries is requesting information about the respective value of a single variable of the one or more variables.

In some embodiments, the one or more queries can consist of multiple queries, and for a first query and a second query of the multiple queries, the second query can be sent only after receiving an answer to the first query from the second network node. In some such embodiments, the second query can be sent only if the answer to the first query includes information that satisfies a given condition.

In some embodiments, the risky event can include an execution of an executable file retrieved from a shared folder.

In some embodiments, the risky event can include a transmission of a network message of a given type.

In some embodiments, the risky event can include an insertion of a removable storage device into a connector of the first network node.

In some embodiments, the method can further comprise: (h) sending, by the reconnaissance agent software module installed on the first network node, one or more other queries to a third network node of the at least some network nodes, the third network node being different from the second network node, the one or more other queries requesting other information that is relevant for determining the value of the specific Boolean condition, and (i) receiving, by the reconnaissance agent software module installed on the first network node and from the reconnaissance agent software module installed on the third network node, one or more other answers to the one or more other queries, the one or more other answers including at least a portion of the other requested information; wherein the determining, by the reconnaissance agent software module installed on the first network node, that the specific Boolean condition is satisfied, can be further based on the at least a portion of the other requested information.

In some embodiments, the one or more queries can be sent only to the second network node.

In some embodiments, the one or more queries can be sent to all network nodes sharing a broadcast domain with the first network node.

In some embodiments, for at least a given part of the requested information, a lack of an answer from the reconnaissance agent software module installed on the second network node regarding the given part can be interpreted by the reconnaissance agent software module installed on the first network node as receiving a pre-defined default answer for the given part.

In some embodiments, at least a part of the at least a portion of the requested information can be locally determined by the reconnaissance agent software module installed on the second network node without receiving it from another computing device.

In some such embodiments, the at least a part of the at least a portion of the requested information can include information about whether the second network node is already known to be compromisable by the attacker of the penetration testing campaign.

In some embodiments, at least a part of the at least a portion of the requested information can be received, by the reconnaissance agent software module installed on the second network node, from another computing device.

In some such embodiments, the other computing device can be the remote computing device. Also in some such embodiments, the at least a part of the at least a portion of the requested information can include information about whether the second network node is already known to be compromisable by the attacker of the penetration testing campaign.

In some embodiments, the method can further comprise: (i) receiving, by the reconnaissance agent software module installed on the first network node and from the remote computing device, information about network addresses of network nodes sharing a common broadcast domain with the first network node; and (ii) based on the received information about network addresses, selecting, by the reconnaissance agent software module installed on the first network node, the second network node to be a destination of the one or more queries.

In some embodiments, the sending of the one or more queries by the reconnaissance agent software module installed on the first network node can be done in response to the detecting of the risky event.

A method is disclosed, according to embodiments, of carrying out, by a simulative penetration testing system, a penetration testing campaign of a networked system, the networked system including multiple network nodes. According to the method, the penetration testing system comprises (A) a penetration testing software module (PTSM) installed on a remote computing device and (B) a reconnaissance agent software module (RASM) installed on at least some network nodes of the multiple network nodes. The method comprises: (a) detecting, by the RASM installed on a first network node of the at least some network nodes, an occurrence of a risky event in the first network node, the risky event being an event that would allow an attacker of the penetration testing campaign to compromise the first network node if a specific Boolean condition is satisfied; (b) reporting, by the RASM installed on the first network node and to the RASM installed on a second network node of the at least some network nodes, the detected occurrence of the risky event in the first network node; (c) determining, by the RASM installed on the second network node, that the specific Boolean condition is satisfied and concluding that the first network node could be compromised by the attacker of the penetration testing campaign; (d) sending, by the reconnaissance agent software module installed on the second network node, a message including a notification that the first network node could be compromised by the attacker of the penetration testing campaign; (e) based on the notification, determining, by the PTSM, a method for the attacker of the penetration testing campaign to compromise the networked system, the method to compromise the networked system comprising a step of compromising the first network node; and (f) reporting, by the PTSM, at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

In some embodiments, the sending of the message including the notification that the first network node could be compromised can include sending the message including the notification to the remote computing device.

In some embodiments, the sending of the message including the notification that the first network node could be compromised can include sending the message including the notification to the RASM installed on the first network node, and the method can further comprise sending, by the RASM installed on the first network node and to the remote computing device, a second message including the notification that the first network node could be compromised.

In some embodiments, a necessary condition for the specific Boolean condition to be satisfied can be that there is a network node of the multiple network nodes, different from the first network node, that is already known to be compromisable by the attacker of the penetration testing campaign and that can communicate with the first network node.

In some embodiments, a necessary and sufficient condition for the specific Boolean condition to be satisfied can be that there is a network node of the multiple network nodes, different from the first network node, that is already known to be compromisable by the attacker of the penetration testing campaign and that can communicate with the first network node.

In some embodiments, the determining, by the RASM installed on the second network node, that the specific Boolean condition is satisfied, can be based on whether the second network node is already known to be compromisable by the attacker of the penetration testing campaign.

In some embodiments, the determining, by the RASM installed on the second network node, that the specific Boolean condition is satisfied, can be based on whether the second network node has write access rights to a given shared folder.

In some embodiments, the determining, by the RASM installed on the second network node, that the specific Boolean condition is satisfied, can be based on whether a given removable storage device had been inserted into the second network node during the penetration testing campaign.

In some embodiments, the risky event can include an execution of an executable file retrieved from a shared folder.

In some embodiments, the risky event can include a transmission of a network message of a given type.

In some embodiments, the risky event can include an insertion of a removable storage device into a connector of the first network node.

In some embodiments, the reporting by the RASM installed on the first network node of the detected occurrence of the risky event in the first network node can be sent in a message that is addressed only to the second network node.

In some embodiments, the reporting by the RASM installed on the first network node of the detected occurrence of the risky event in the first network node can be sent in a broadcast message that is addressed to all network nodes sharing a broadcast domain with the first network node.

In some embodiments, the determining, by the RASM installed on the second network node, that the specific Boolean condition is satisfied, can be based only on information locally available in the second network node at the time of receiving, in the second network node, a message reporting the occurrence of the risky event in the first network node.

In some such embodiments, the information locally available in the second network node at the time of receiving the message reporting the occurrence of the risky event in the first network node can include information about whether the second network node is already known to be compromisable by the attacker of the penetration testing campaign.

In some embodiments, the determining, by the RASM installed on the second network node, that the specific Boolean condition is satisfied, can be based on information received in the second network node from another computing device subsequent to the time of receiving, in the second network node, a message reporting the occurrence of the risky event in the first network node.

In some such embodiments, the other computing device is the remote computing device.

Also in some such embodiments, the information received in the second network node from another computing device subsequent to the time of receiving, in the second network node, the message reporting the occurrence of the risky event in the first network node, can include information about whether the second network node is already known to be compromisable by the attacker of the penetration testing campaign.

In some embodiments, the method can further comprise: (i) receiving, by the RASM installed on the first network node and from the remote computing device, information about network addresses of network nodes sharing a common broadcast domain with the first network node; and (ii) based on the received information about network addresses, selecting, by the RASM installed on the first network node, the second network node to be a destination of the reporting of the detected occurrence of the risky event in the first network node.

In some embodiments, the reporting by the RASM installed on the first network node of the detected occurrence of the risky event in the first network node can be done in response to the detecting of the risky event.

A method is disclosed, according to embodiments, of carrying out, by a simulative penetration testing system, a penetration testing campaign of a networked system including multiple network nodes. According to the method, the penetration testing system comprises (A) a penetration testing software module (PTSM) installed on a remote computing device and (B) a reconnaissance agent software module (RASM) installed on at least some network nodes of the multiple network nodes. The method comprises: (a) determining, by the PSM, that a first network node of the at least some network nodes could be compromised by the attacker of the penetration testing campaign; (b) notifying the RASM installed on the first network node, by the PTSM, that the first network node could be compromised by the attacker of the penetration testing campaign; (c) based on the notifying, determining that a second network node of the at least some network nodes could be compromised by the attacker of the penetration testing campaign; (d) determining, by the PTSM, a method for the attacker of the penetration testing campaign to compromise the networked system, the method to compromise the networked system comprising a step of compromising the first network node and a step of compromising the second network node; and (e) reporting, by the remote computing device, at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

In some embodiments, the determining that the second network node could be compromised by the attacker of the penetration testing campaign can be done by the RASM installed on the second network node.

In some embodiments, the determining that the second network node could be compromised by the attacker of the penetration testing campaign can be done by the RASM installed on the first network node.

A simulative penetration testing system is disclosed, according to embodiments, for carrying out a penetration testing campaign of a networked system for determining a way for an attacker to compromise the networked system, the networked system including multiple network nodes. The penetration testing system comprises: (a) a computing device comprising one or more processors, the computing device in networked communication with at least some of the multiple network nodes of the networked system; (b) a first non-transitory computer-readable storage medium having stored therein program instructions, which when executed by one or more processors of a first network node of the multiple network nodes, cause the one or more processors of the first network node to carry out the following steps: (i) detecting an occurrence of a risky event in the first network node, the risky event being an event that would allow an attacker of the penetration testing campaign to compromise the first network node if a specific Boolean condition is satisfied, (ii) sending one or more queries to a second network node of the multiple network nodes, the one or more queries requesting information that is relevant for determining a value of the specific Boolean condition, (iii) receiving, from the second network node, one or more answers to the one or more queries, the one or more answers including at least a portion of the requested information, (iv) based on the received at least a portion of the requested information, determining that the specific Boolean condition is satisfied and concluding that the first network node could be compromised by the attacker of the penetration testing campaign, and (v) sending a message to the computing device, the message notifying the computing device that the first network node could be compromised by the attacker of the penetration testing campaign. The penetration testing system also comprises (c) a second non-transitory computer-readable storage medium having stored therein program instructions, which when executed by one or more processors of the computing device cause the one or more processors of the computing device to carry out the following steps: (i) determining a method for the attacker of the penetration testing campaign to compromise the networked system, the method to compromise the networked system comprising a step of compromising the first network node; and (ii) reporting at least one security vulnerability of the networked system determined to exist based on results of the carrying out of the penetration testing campaign, wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system.

In some embodiments, (i) the requested information that is relevant for determining the value of the specific Boolean condition can include information about the respective value of each of one or more variables, where each of the one or more variables is a Boolean variable or a numerical variable; (ii) the received at least a portion of the requested information can include the respective values of at least some of the one or more variables; and (iii) the determining that the specific Boolean condition is satisfied can be based on the received respective values of the at least some of the one or more variables.

In some embodiments, a necessary condition for the specific Boolean condition to be satisfied can be that there is a network node of the multiple network nodes, different from the first network node, that is already known to be compromisable by the attacker of the penetration testing campaign and that can communicate with the first network node.

In some embodiments, a necessary and sufficient condition for the specific Boolean condition to be satisfied can be that there is a network node of the multiple network nodes, different from the first network node, that is already known to be compromisable by the attacker of the penetration testing campaign and that can communicate with the first network node.

In some embodiments, the one or more variables can include a Boolean variable whose value is true if and only if the second network node is already known to be compromisable by the attacker of the penetration testing campaign.

In some embodiments, the one or more variables can consist of a single Boolean variable.

In some embodiments, the one or more variables can include a Boolean variable whose value is true if and only if the second network node has write access rights to a given shared folder.

In some embodiments, the one or more variables can include a variable whose respective value may change during the penetration testing campaign.

In some embodiments, the one or more variables can include a Boolean variable whose value is true if and only if a given removable storage device had been inserted into the second network node during the penetration testing campaign.

In some embodiments, the one or more variables can include a numerical variable whose value indicates a count of occurrences of a given event.

In some embodiments, the one or more queries can consist of a single query which is requesting information about the respective values of multiple variables of the one or more variables.

In some embodiments, the one or more queries can consist of multiple queries, where each query of the multiple queries is requesting information about the respective value of a single variable of the one or more variables.

In some embodiments, (i) the one or more queries can consist of multiple queries, and (ii) for a first query and a second query of the multiple queries, the second query can be sent only after receiving an answer to the first query from the second network node.

In some such embodiments, the second query can be sent only if the answer to the first query includes information that satisfies a given condition.

In some embodiments, the risky event can include an execution of an executable file retrieved from a shared folder.

In some embodiments, the risky event can include a transmission of a network message of a given type.

In some embodiments, the risky event can include an insertion of a removable storage device into a connector of the first network node.

In some embodiments, the program instructions stored in the first non-transitory computer-readable storage medium, when executed by the one or more processors of the first network node, can additionally cause the one or more processors of the first network node to carry out the following steps: (vi) sending one or more other queries to a third network node of the at least some network nodes, the third network node being different from the second network node, the one or more other queries requesting other information that is relevant for determining the value of the specific Boolean condition; and (vii) receiving, from the third network node, one or more other answers to the one or more other queries, the one or more other answers including at least a portion of the other requested information; wherein the determining that the specific Boolean condition is satisfied, can be further based on the at least a portion of the other requested information.

In some embodiments, the one or more queries can be sent only to the second network node.

In some embodiments, the one or more queries can be sent to all network nodes sharing a broadcast domain with the first network node.

In some embodiments, for at least a given part of the requested information, the program instructions stored in the first non-transitory computer-readable storage medium, when executed by the one or more processors of the first network node, can additionally cause the one or more processors of the first network node to interpret a lack of an answer from the second network node regarding the given part as receiving a pre-defined default answer for the given part.

In some embodiments, at least a part of the at least a portion of the requested information can be locally determined at the second network node without receiving it from another computing device.

In some such embodiments, the at least a part of the at least a portion of the requested information can include information about whether the second network node is already known to be compromisable by the attacker of the penetration testing campaign.

In some embodiments, at least a part of the at least a portion of the requested information can be received, by the second network node, from another computing device.

In some such embodiments, the other computing device can be the computing device that is in networked communication with at least some of the multiple network nodes.

Also in some such embodiments, the at least a part of the at least a portion of the requested information can include information about whether the second network node is already known to be compromisable by the attacker of the penetration testing campaign.

In some embodiments, the program instructions stored in the first non-transitory computer-readable storage medium, when executed by the one or more processors of the first network node, can additionally cause the one or more processors of the first network node to carry out the following steps: (i) receiving, from the computing device, information about network addresses of network nodes sharing a common broadcast domain with the first network node; and (ii) based on the received information about network addresses, selecting the second network node to be a destination of the one or more queries.

In some embodiments, the sending of the one or more queries can be done in response to the detecting of the risky event.

A simulative penetration testing system is disclosed, according to embodiments, for carrying out a penetration testing campaign of a networked system for determining a way for an attacker to compromise the networked system, the networked system including multiple network nodes. The penetration testing system comprises: (a) a computing device comprising one or more processors, the computing device in networked communication with at least some of the multiple network nodes of the networked system; (b) a first non-transitory computer-readable storage medium, having stored therein program instructions, which when executed by one or more processors of a first network node of the multiple network nodes, cause the one or more processors of the first network node to carry out the following steps: (i) detecting an occurrence of a risky event in the first network node, the risky event being an event that would allow an attacker of the penetration testing campaign to compromise the first network node if a specific Boolean condition is satisfied, and (ii) reporting, to a second network node of the at least some network nodes, the detected occurrence of the risky event in the first network node. The penetration testing system additionally comprises (c) a second non-transitory computer-readable storage medium, having stored therein program instructions, which when executed by one or more processors of a second network node of the multiple network nodes, cause the one or more processors of the second network node to carry out the following steps: (i) determining that the specific Boolean condition is satisfied and concluding that the first network node could be compromised by the attacker of the penetration testing campaign, and (ii) sending a message including a notification that the first network node could be compromised by the attacker of the penetration testing campaign. The penetration testing system further comprises: (d) a third non-transitory computer-readable storage medium having stored therein program instructions, which when executed by one or more processors of the computing device cause the one or more processors of the computing device to carry out the following steps: (i) based on the notification, determining a method for the attacker of the penetration testing campaign to compromise the networked system, the method to compromise the networked system comprising a step of compromising the first network node; and (ii) reporting at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

In some embodiments, the sending of the message including the notification that the first network node could be compromised can include sending the message including the notification to the computing device.

In some embodiments, the sending of the message including the notification that the first network node could be compromised can include sending the message including the notification to the first network node, and the program instructions stored in the first non-transitory computer-readable storage medium, when executed by the one or more processors of the first network node, can additionally cause the one or more processors of the first network node to carry out the following step: sending, to the computing device, a second message including the notification that the first network node could be compromised.

In some embodiments, a necessary condition for the specific Boolean condition to be satisfied can be that there is a network node of the multiple network nodes, different from the first network node, that is already known to be compromisable by the attacker of the penetration testing campaign and that can communicate with the first network node.

In some embodiments, a necessary and sufficient condition for the specific Boolean condition to be satisfied can be that there is a network node of the multiple network nodes, different from the first network node, that is already known to be compromisable by the attacker of the penetration testing campaign and that can communicate with the first network node.

In some embodiments, the determining that the specific Boolean condition is satisfied, can be based on whether the second network node is already known to be compromisable by the attacker of the penetration testing campaign.

In some embodiments, the determining that the specific Boolean condition is satisfied, can be based on whether the second network node has write access rights to a given shared folder.

In some embodiments, the determining that the specific Boolean condition is satisfied, can be based on whether a given removable storage device had been inserted into the second network node during the penetration testing campaign.

In some embodiments, the risky event can include an execution of an executable file retrieved from a shared folder.

In some embodiments, the risky event can include a transmission of a network message of a given type.

In some embodiments, the risky event can include an insertion of a removable storage device into a connector of the first network node.

In some embodiments, the reporting of the detected occurrence of the risky event in the first network node can be sent in a message that is addressed only to the second network node.

In some embodiments, the reporting of the detected occurrence of the risky event in the first network node can be sent in a broadcast message that is addressed to all network nodes sharing a broadcast domain with the first network node.

In some embodiments, the determining that the specific Boolean condition is satisfied, can be based only on information locally available in the second network node at the time of receiving, in the second network node, a message reporting the occurrence of the risky event in the first network node.

In some such embodiments, the information locally available in the second network node at the time of receiving the message reporting the occurrence of the risky event in the first network node can include information about whether the second network node is already known to be compromisable by the attacker of the penetration testing campaign.

In some embodiments, the determining that the specific Boolean condition is satisfied, can be based on information received in the second network node from another computing device subsequent to the time of receiving, in the second network node, a message reporting the occurrence of the risky event in the first network node.

In some such embodiments, the other computing device can be the computing device.

Also in some such embodiments, the information received in the second network node from another computing device subsequent to the time of receiving, in the second network node, the message reporting the occurrence of the risky event in the first network node, can include information about whether the second network node is already known to be compromisable by the attacker of the penetration testing campaign.

In some embodiments, the program instructions stored in the first non-transitory computer-readable storage medium, when executed by the one or more processors of the first network node, can additionally cause the one or more processors of the first network node to carry out the following steps: (iii) receiving, from the computing device, information about network addresses of network nodes sharing a common broadcast domain with the first network node; and (iv) based on the received information about network addresses, selecting the second network node to be a destination of the reporting of the detected occurrence of the risky event in the first network node.

In some embodiments, the reporting of the detected occurrence of the risky event in the first network node can be done in response to the detecting of the risky event.

A simulative penetration testing system is disclosed, according to embodiments, for carrying out a penetration testing campaign of a networked system for determining a way for an attacker to compromise the networked system, the networked system including multiple network nodes. The penetration testing system comprises: (a) a computing device comprising one or more processors, the computing device in networked communication with at least some of the multiple network nodes of the networked system; and (b) a first non-transitory computer-readable storage medium having stored therein a first set of program instructions, which when executed by the one or more processors of the computing device, cause the one or more processors of the computing device to carry out the following steps: (i) determining that a first network node of the at least some network nodes could be compromised by the attacker of the penetration testing campaign; (ii) notifying the first network node that the first network node could be compromised by the attacker of the penetration testing campaign; (iii) determining a method for the attacker of the penetration testing campaign to compromise the networked system, the method to compromise the networked system comprising a step of compromising the first network node and a step of compromising a second network node of the at least some network nodes; and (iv) reporting at least one security vulnerability of the networked system determined to exist based on results of the carrying out of the penetration testing campaign, wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system. The penetration testing system additionally comprises: (c) a second non-transitory computer-readable storage medium, having stored therein a second set of program instructions, which when executed by one or more processors of the second network node, cause the one or more processors of the second network node to carry out the following step: based on the notifying that the first network node could be compromised, determining that the second network node could be compromised by the attacker of the penetration testing campaign.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 6A-6D show flowcharts of methods of carrying out a penetration testing campaign of a networked system by a simulative penetration testing system, according to embodiments of the present invention

DETAILED DESCRIPTION OF THE EMBODIMENTS

Figure 1:
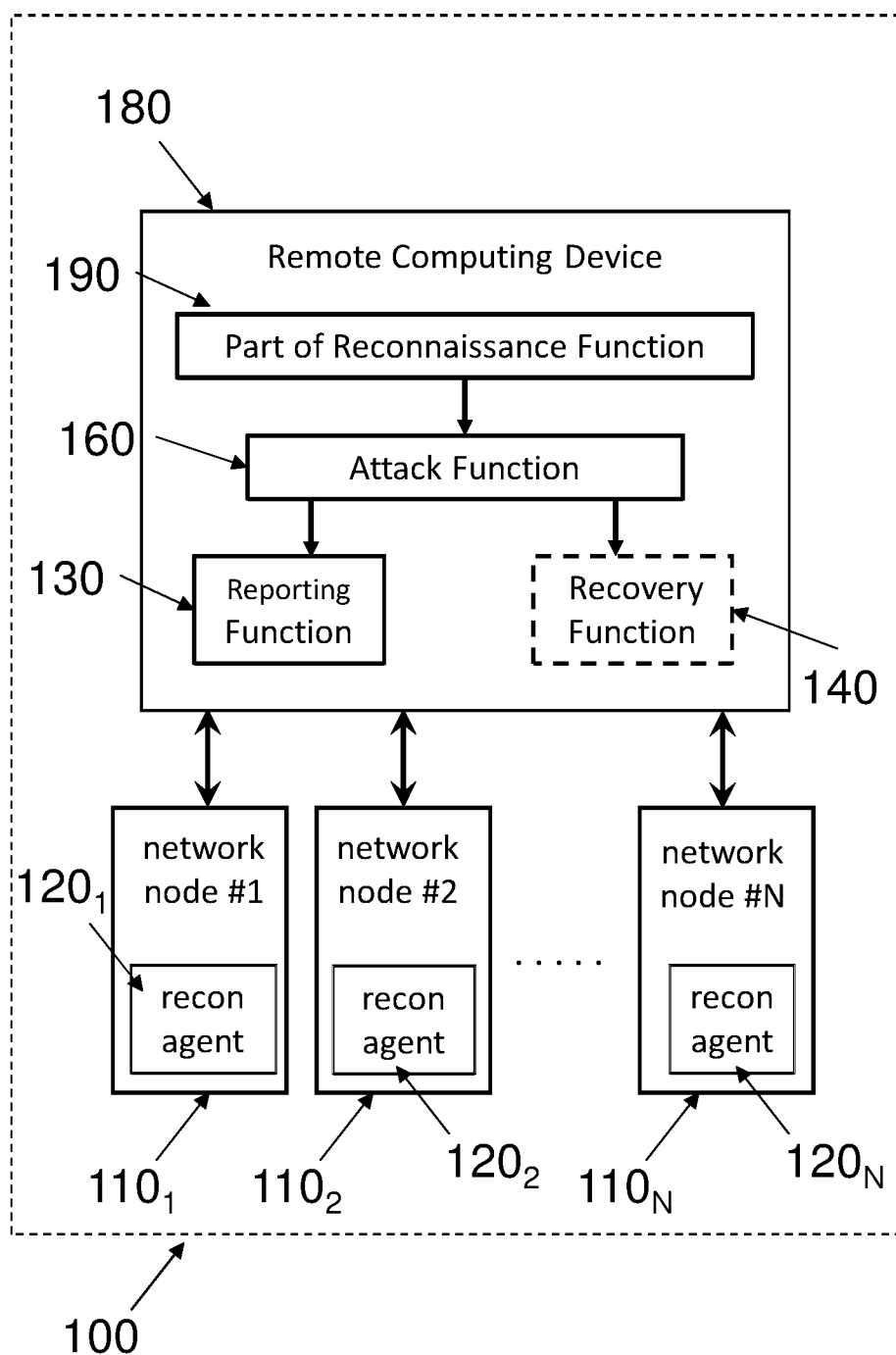
FIG. 1 is a functional block diagram of a reconnaissance agent penetration testing system which may employ embodiments of the present invention.

Note: Throughout this disclosure, subscripted reference numbers (e.g., 101) or letter-modified reference numbers (e.g., 100a) may be used to designate multiple separate appearances of elements in a single drawing, e.g. 10 is a single appearance (out of a plurality of appearances) of element 10, and likewise 100a is a single appearance (out of a plurality of appearances) of element 100.

Penetration testing systems may use different architectures. One possible architecture is "reconnaissance agent penetration testing" (or "recon agent penetration testing"). In a penetration testing system that uses such architecture the functionality of the reconnaissance function is at least partially implemented by a reconnaissance agent (a.k.a "recon agent") software module installed on and executed in multiple network nodes of the tested networked system. Each of the agents installed on a network node collects data about its hosting node and its incoming and outgoing communication and reports its findings to a remote computing device (a.k.a. "central computing device") of the penetration testing system.

An example of a reconnaissance agent penetration testing system and a possible division of work between the remote computing device and the reconnaissance agents of the system is disclosed in U.S. Pat. No. 10,038,711 which is incorporated herein by reference in its entirety.

In prior art reconnaissance agent penetration testing systems, a recon agent installed on a hosting network node of the tested networked system is dedicated to collecting data about its hosting node and about communication messages entering and leaving its hosting node and to reporting the collected data to the remote computing device of the penetration testing system. Decisions regarding determination of vulnerabilities in individual network nodes and regarding determination of paths of attack available to attackers for compromising the tested networked system are made in the remote computing device of prior art penetration testing systems. Similarly, knowledge bases regarding potential vulnerabilities on which the penetration testing system relies for making its determinations are accessed from the remote computing device of the prior art penetration testing system. However, this architecture causes some difficulties, as will be seen below.

Example 1

In a first example, a vulnerability may be caused when a first network node periodically or frequently retrieves a given executable file from a shared folder and then executes it. If a second node that can also access the shared folder has write access rights to the shared folder, then an attacker controlling the second node can compromise the first network node. In order to achieve this, the attacker may cause the second node (which he already controls) to poison the given executable file by inserting into the file malicious code that will be executed whenever the file is executed and will give the attacker control of the first node once it executes the poisoned file.

While the recon agent installed on the first node can find out about the periodic or frequent execution of the file by the first node, that agent cannot conclude with certainty that an attacker that had compromised the second node can also compromise the first node. In order to know whether this statement is true, it is necessary to know whether the second node has write access rights for the shared folder, information that is typically not available to the agent installed on the first node. Moreover, even if the agent of the first node would have known that the second node has write access rights to the shared folder, it still cannot determine that the first node is compromisable, because it does not know whether the second node was already compromised and is already controlled by the attacker during the current penetration testing campaign.

Therefore, prior art reconnaissance agent penetration testing systems operate by having the recon agents send only raw data to the remote computing device, leaving the determination of conclusions to the remote computing device. In the current example, once the agent installed on the first node determines that the first node periodically or frequently retrieves and executes the given executable file from the shared folder, it reports this fact to the remote computing device. Additionally, the agent installed on the second node may report to the remote computing device what access rights the second node has for the shared folder (i.e. including whether the second node has write access rights to the shared folder or not). This reporting may be done in advance and be independent of the reporting of the agent of the first node, or it may be done in response to the reporting of the agent of the first node, for example by responding to a request from the remote computing device to provide that information, which request is in turn being submitted in response to receiving from the first node a report about the periodic or frequent execution of the file from the shared folder.

At this stage the remote computing device of the penetration testing system has access to the following information:

A. Whether the first node periodically or frequently retrieves and executes an executable file from a shared folder (from the reporting of the agent installed on the first node)

B. Whether the second node has write access rights to the shared folder (from the reporting of the agent installed on the second node)

C. Whether the second node is already under the control of the attacker in the current penetration testing campaign (from the management of the campaign by the remote computing device)

Based on the above information, the remote computing device can determine with full certainty whether the first node could now be compromised and brought under the control of the attacker in the current penetration testing campaign.

Example 2

In a second example, a vulnerability may be caused when a network node transmits a certain network message of a type that creates an opportunity for attackers. An illustration of this is a network node that transmits a request message according to the ARP (Address Resolution Protocol) protocol in order to find out which MAC (Media Access Control) address (e.g. Ethernet address) corresponds to a given IP address. According to the ARP protocol, a first network node that wants to communicate with a second node located on the same local network, but knows only the IP address of the second node and not its MAC address (i.e. the required translation of the second node's IP address to its MAC address is not found in the address matching cache of the first node), submits an ARP request broadcast message containing its own MAC and IP addresses and the known IP address of the second node. In response, the second node is expected, when identifying its IP address in the ARP request message, to send an ARP reply message containing its own MAC and IP addresses as well as the MAC and IP addresses of the first node that sent the ARP request. Upon identifying that the reply is addressed to it, the first node can extract from the reply the previously unknown MAC address of the second node, store it in its address matching cache for later use, and use the MAC address for communicating with the second node.

The sending of an ARP request message, even though it is a legitimate action by the sending node, nonetheless might create an opportunity for an attacker. When a first node transmits an ARP request message asking for the MAC address of a second node having a given IP address, a third node, that is already under the control of an attacker, might use the opportunity to perform "ARP spoofing". This may be accomplished by the third node responding to the ARP request message before the true addressee of the message (the second node) does so. The false response provided by the third, compromised, node will be a formally valid ARP reply message that includes a false MAC address belonging to the third node, or to another already compromised node. As a result, the false MAC address will be used by the first node for communicating with what it believes to be the second node, while in reality the first node will be communicating with a compromised node which is controlled by the attacker. This might lead to a successful denial-of-service, man-in-the-middle, or session-hijacking attack, thus compromising the first node by the attacker.

However, when the agent installed on the first node detects the sending of an ARP request message from its hosting node, it cannot conclude with certainty that its hosting node can now be compromised by the attacker in the current penetration testing campaign. This is so because an ARP request message is only visible to nodes in the same local network as the node transmitting the ARP request message (i.e. only to nodes sharing a common broadcast domain with the node transmitting the ARP request message). Therefore, an ARP request message can be used by an attacker only if that attacker already controls at least one other node in that local network. Whether this condition is currently satisfied or not is not known to the agent of the transmitting node.

Therefore, in prior art reconnaissance agent penetration testing systems, an agent detecting the sending of an ARP request message by its hosting node makes no conclusions on its own. It reports to the remote computing device of the penetration testing system about its factual finding, and it is left for the remote computing device to decide, based on its knowledge of the compromisability state of all nodes and the structure of the tested networked system, whether the transmitting node should now be declared compromisable or not.

Example 3

In a third example, a vulnerability may be caused when a user of a network node inserts a removable USB drive into a USB port of network node. Such action by a user might create an opportunity for an attacker to compromise the network node into which the USB drive is inserted, but only if the attacker can poison that USB drive, prior to the insertion, by writing into it a poisoned executable file that will be automatically executed upon insertion. This in turn could have been achieved if that USB drive would have been inserted, prior to its current insertion, into another node that is already under control of the attacker at the time of the previous insertion.

However, when the agent installed on the first node detects the insertion of the USB drive into its hosting node, it cannot conclude with certainty that its hosting node can now be compromised by the attacker in the current penetration testing campaign. This is so because the agent does not know whether that USB drive had been previously inserted into another node. Moreover, even if the agent could somehow tell that the USB drive had been previously inserted into another node, it would still not be able to conclude with certainty that its hosting node could now become compromised because it does not know whether the other node into which the USB drive was previously inserted was under the attacker's control at the time of the insertion.

Therefore, in prior art reconnaissance agent penetration testing systems, an agent detecting the insertion of a USB drive makes no conclusions on its own. It reports to the remote computing device of the penetration testing system about its factual finding, and it is left for the remote computing device to decide, based on reports from other nodes and on its knowledge of the compromisability state of all nodes, whether the currently reporting node should now be declared compromisable or not.

The common denominator of all the above examples is that in order to reach conclusions about compromisability of network nodes of a tested networked system with certainty, the recon agents must conduct extensive communication with the remote computing device of the penetration testing system.

However, such a method of operation of prior art recon agent penetration testing systems might be problematic. A tested networked system may include tens of thousands of network nodes and recon agents, and the amount of communication required to support the above method of operation might become too high. In other words, the exchanging of commands and reports between the remote computing device and the numerous agents might consume a significant portion of the bandwidth of the tested networked system and of the processing power of the remote computing device.

Therefore, it is desirable to reduce the amount of communication between recon agents and the remote computing device, while preserving the many advantages provided by the recon agent penetration testing architecture.

In a recon agent penetration testing system according to embodiments of the present invention, a first recon agent installed on a first network node communicates directly with a second recon agent installed on a second node. More specifically, the first agent can send a query to the second agent asking it to provide information about its hosting node, and the second agent can respond to the query by providing the requested information.

The query sent by the first node may be addressed to one specific node or it may be addressed to multiple nodes in parallel. For example, in the 'ARP message' example presented above (Example 2), the agent in the sending node may send a query addressed to all nodes sharing a common broadcast domain with its hosting node, asking each of them whether it is already compromised in the current campaign. Each of the recipients in the local network responds to the query by sending a YES/NO answer to the question. Alternatively, only nodes that are already compromised in the current campaign respond with a YES, while those that are not compromised just keep quiet. In other embodiments, the agent in the node sending the ARP message may send a separate query to each of the nodes in the local network, each such query explicitly addressed to only one node. A node receiving such single-addressee query always provides its YES/NO answer. Alternatively, only a node that is already compromised in the current campaign provides an answer, while nodes that are not compromised just ignore the query. It should be noted that embodiments sending separate queries to each recipient require the querying agent to know the structure of its local network (i.e. which nodes reside on its local network). This issue is further discussed below.

A first case of a first agent requesting information from a second agent is when the requested information can be locally determined by the second agent without requiring help from outside. In the above example regarding a shared folder (Example 1), a query may ask the receiving node whether it has write access rights to a given shared folder. The receiving agent can determine the answer to the query by analyzing information locally available in its hosting node.

A second case of a first agent requesting information from a second agent is when the requested information cannot always be locally determined by the second agent without requiring help from outside. A query may ask the receiving node whether it is already determined to be compromisable by the attacker in the current campaign. This information may not be known to agents of prior art recon agent penetration testing systems. It is possible that an agent according to embodiments of the present invention will determine by itself that its hosting node is compromisable and will report that determination to the remote computing device. Therefore, it is possible that an agent of the present invention will be able to answer a query about the compromisability of its hosting node with no external help.

However, it is also possible that an agent of the present invention does not know whether its hosting node is already known to be compromisable in the current campaign. In some cases, a determination of compromisability of a node may be made by the remote computing device and not in the node in question. For example, the remote computing device may get a report from an agent of a node that is accessible from the outside world, indicating that the node runs a particular version of a certain operating system (OS). The penetration testing system's vulnerabilities knowledge base, which may only be accessible to the remote computing device and not to the agents, may say that this particular OS/version is vulnerable to a given attack. As a result, the remote computing device can declare the node to be compromisable, without relying on the local agent for doing so.

Therefore, for the present invention to bring benefit even when a determination of compromisability of a node is done by the remote computing device, the remote computing device may update the agent of a given node of any determination of the compromisability of that given node. When doing so, an agent queried for the compromisability state of its hosting node can respond to the query with the most updated answer, regardless of whether the determination of compromisability was done by the agent or by the remote computing device of the penetration testing system.

As discussed hereinabove with respect to Example 2, there may be cases in which an agent needs to know the addresses of the other members of its local network (i.e. its broadcast domain) or to know other information related to the structure of the tested networked system. This is the case, for example, in embodiments that address each query only to a single "fellow agent" when there is a need to determine whether there is a node in the local network that is already determined to be compromisable in the current campaign.

In some embodiments, network structure information (e.g. addresses of nodes sharing a broadcast domain with a given node) may be provided to the agent by the remote computing device, either at the beginning of the campaign or dynamically during the campaign in response to a request from the agent. The remote computing device may obtain the network structure information from the user of the penetration testing system, or it may automatically determine the network structure information based on information provided by agents. Methods of implementing such a task are described in U.S. Pat. Nos. 8,844,041 and 10,440,044, both of which are hereby incorporated herein by reference in their entirety.

In other embodiments, network structure information (e.g. addresses of nodes sharing a local network with a given node) may be determined by an agent without relying on the remote computing device. An agent may implement such task by sniffing messages in its local network or by scanning all possible addressees in its local subnet based on knowing its own IP address.

In still other embodiments, some portions of network structure information are provided to the agent by the remote computing device, while other portions of network structure information are locally determined by the agent. As the network structure information that is of interest for a given agent is mostly information about its local network (i.e. its broadcast domain), an agent may rely on the remote computing device for information about remote parts of the tested networked system, while making its own determinations regarding its local network.

Referring again to Example 1, the shared folder example may be handled by the following steps:

a. An agent detects that its hosting node periodically or frequently retrieves and executes an executable file from a given shared folder.
b. In response to the detection, the agent submits a first query addressed to all the nodes in its local network, asking each recipient node whether it has write access rights to the given shared folder.
c. Those nodes in the local network that have write access rights to the given shared folder respond to the first query with a positive answer.
d. For each given node that provided a positive answer to the first query, the agent submits a second query to the given node, asking whether the given node is already determined to be compromisable in the current campaign.
e. Those nodes that had responded positively to the first query and that are already determined to be compromisable in the current campaign provide a positive answer to the second query.
f. If there is at least one node that provided positive answers to both the first and the second queries, the agent reports to the remote computing device that its hosting node is now determined to be compromisable by the attacker in the present campaign because it is vulnerable to an attack based on its careless use of the given shared folder.
g. If there is no node that provided positive answers to both the first and the second queries, the agent reports to the remote computing device only the raw fact that the its hosting node periodically or frequently retrieves and executes an executable file from the given shared folder.
h. It is now up to the remote computing device to look for other nodes (outside the local network of the node hosting the reporting agent) that have write access rights to the given shared folder and are determined to be compromisable.

Referring again to Example 2, the ARP message example may be handled by the following steps:

a. An agent detects that its hosting node transmits an ARP request message.
b. In response to the detection, the agent submits a query addressed to all the nodes in its local network, asking each recipient node whether it was already determined to be compromisable in the current campaign.
c. Those nodes in the local network that are already determined to be compromisable in the current campaign provide a positive answer to the query.
d. If there is at least one node that provided a positive answer to the query, the agent reports to the remote computing device that its hosting node is now determined to be compromisable by the attacker in the present campaign because it is vulnerable to an ARP Spoofing attack based on its use of an ARP request.
e. If there is no node that provided a positive answer to the query, the agent reports to the remote computing device only the raw fact that the its hosting node had sent an ARP request. (Note that because an ARP Spoofing attack can only be launched from a node residing in the same local network as the node sending the ARP request, and because all such nodes were already determined by the query to not be compromisable at the current time, there is no point in the remote computing device trying to look for other ways of exploiting the ARP request. Therefore, this step is optional, as no harm is caused if the agent does not report the occurrence of the ARP request to the remote computing device).

Referring again to Example 3, the removable USB drive example may be handled by the following steps:
  a. An agent detects that a given removable USB drive (e.g. identified by its serial number) was inserted into its hosting node.
  b. In response to the detection, the agent submits a first query addressed to all the nodes in its local network, asking each recipient node whether it was already determined to be compromisable in the current campaign.
  c. Those nodes in the local network that are already determined to be compromisable in the current campaign respond to the first query with a positive answer.
  d. For each given node that provided a positive answer to the first query, the agent submits a second query to the given node, asking whether the given USB drive had been previously inserted into the given node.
  e. Those nodes that had responded positively to the first query and that had previously detected an insertion of the given USB drive provide a positive answer to the second query.
  f. If there is at least one node that provided positive answers to both the first and the second queries, the agent reports to the remote computing device that its hosting node is now determined to be compromisable by the attacker in the present campaign because it is vulnerable to an attack based on its careless use of the given USB drive.
  g. If there is no node that provided positive answers to both the first and the second queries, the agent reports to the remote computing device only the raw fact that the given USB drive had been inserted into its hosting node.
  h. It is now up to the remote computing device to look for other nodes (outside the local network of the node hosting the reporting agent) that had previously detected an insertion of the given USB drive and were already determined to be compromisable at the time of the insertion.

It should be noted that the above sequences of steps are non-limiting examples, and the three examples of vulnerabilities may be handled by other sequences of steps. This is illustrated by the fact that the query for nodes that are already determined to be compromisable is arbitrarily selected to be the second query in the first example and to be the first query in the third example.

Embodiments are not limited to the cases represented by the above examples. Additional non-limiting example cases are presented in the paragraphs below.

In some embodiments, the event whose detection triggers a determination that a given node in which the event occurred could be compromised by the attacker of the current penetration testing campaign can be associated with a Boolean condition that if satisfied enables the agent installed in the given node to make the determination about its hosting node.

The associated Boolean condition may be a simple condition, resulting in a query sent to other nodes containing only a single binary question. This is the case, for example, in Example 2 above (the ARP request example), where the query contains the simple binary question of whether the recipient node is already known to be compromisable by the attacker of the current campaign.

Alternatively, the associated Boolean condition may be a compound condition, resulting in a query (or multiple queries) sent to other nodes containing multiple binary questions whose answers should be combined by logical operators in order to reach the final answer. This is the case, for example, in Example 1 above (the shared folder example), where the one or more queries contain two questions: (i) whether the recipient node has write access rights to the given shared folder, and (ii) whether the recipient node is already known to be compromisable by the attacker of the current campaign, and according to the example, the answers to the two questions are ANDed together.

In another example of a compound condition the answers to the individual questions can be ORed together. More complex forms, which require logical evaluations using both AND and OR operations are also possible.

The information required for determining the value of the associated Boolean condition is not limited to binary values. The one or more queries sent to other nodes may contain questions whose answers are numerical values. For example, the determination of compromisability may depend on whether a given removable USB storage device was frequently inserted into the recipient node, where the criterion for "frequently inserted" is at least three insertions since the beginning of the current campaign. In this example, the one or more queries may contain the question "how many times the given USB storage device had been inserted during the current campaign?", and the answer of the recipient node should be a number.

The answer to a question included in a query may be constant during the campaign or it may change during the campaign so that different answers are provided if the same question is asked multiple times. For example, the question "does the recipient node have write access rights to a given shared folder" will typically not change during the campaign (even though it could theoretically change), while the questions "was the recipient node already determined to be compromisable by the attacker in the current campaign?" and "does the recipient node currently have a given removable storage device connected to it?" may have different answers at different times during the campaign.

In some cases, it is not necessary to ask a recipient node all the questions that may be relevant for reaching the final answer, because an answer to a first question can make an answer for a second question redundant. For example, if the condition to be satisfied in order to determine compromisability of a node is a compound condition having the form A AND B, then receiving an negative answer for A makes it unnecessary to ask about B, as it can already be determined the compound condition will not be satisfied and compromisability cannot be determined. This is the case in Example 1 (the shared folder example) and in Example 3 (the removable USB drive example), in which a recipient node is first asked a first question, and only if its answer is positive, it is asked a second question.

In some cases, separate queries must be sent to different addresses, i.e., addresses of different nodes. A first example is when the node sending the one or more queries implements a policy of not sending broadcast messages or otherwise cannot send broadcast messages to its local network. In such case, separate queries are sent to each node in the local network (even though the questions included in the separate queries can be the same for all recipients). A second example is when the node in question participates in two different local networks (i.e. if the node in question is a gateway connecting the two networks). In such a case, it is typically not possible to address all neighboring nodes in a single common broadcast message, and each network requires at least one message. The messages addressed to the two networks may include different questions or the same questions, depending on the details of the triggering event.

In cases in which multiple nodes are being queried, the reconnaissance agent installed on the node sending the queries may have to take into account answers received from all addressed nodes in order to determine the value of the associated Boolean condition. For example, in the ARP message example, if the local network includes only three nodes, and therefore two nodes are queried by the third node about their status of compromisability, the agent of the third node checks whether at least one of the two nodes is already known to be compromisable, in which case the third node is now determined to be compromisable.

In the examples provided thus far, the determination that the attacker could compromise a given network node was done by the reconnaissance agent installed on that given node, based on information received from other nodes. However, in other embodiments the determination that the attacker could compromise a given network node is done by the reconnaissance agent installed on a different node, i.e., the node providing the information required for making the determination. In such other embodiments, the first node, for which the determination is sought and in which the triggering event was detected, sends out a notification to other relevant nodes about the occurrence of the event—but sends out no queries. The reconnaissance agent installed on a node receiving the notification knows what local conditions at the receiving node are required in order for the associated Boolean condition to be satisfied. If the reconnaissance agent of the receiving node established that the required conditions are satisfied, it can also determine on its own that the first node is compromisable by the attacker. After making such a determination, the receiving node notifies the remote computing device about the determination. The notifying may be done directly by sending a message from the receiving node to the remote computing device or indirectly by sending a message to the first node (the one determined to be compromisable), in response to which the first node sends another message to the remote computing device, notifying it about the determination.

It should be noted that in such implementations it is possible that multiple determinations will be made for the same node. For example, in the ARP message example presented above, if there are three nodes in the local network which are already known to be compromisable and all of them receive the report about the detected event (the sending of the ARP request by another node), then all three nodes may make the determination about the compromisability of the reporting node and update the remote computing device about it. However, no harm is caused if this happens, as the remote computing device would simply ignore the second and later notifications.

All relevant details and examples presented above for the implementations in which the determination of compromisability is made in the node in which the event is detected, are equally applicable to the implementations in which the determination of compromisability is made in another node, with obvious adaptations. For the sake of brevity those details and examples are not repeated here.

It should be emphasized that an important characteristic of some embodiments is that the remote computing device notifies the reconnaissance agent installed on a given network node that the given network node was determined to be compromisable by the attacker of the penetration testing campaign. The notifying may be done in response to a query submitted from the given node to the remote computing device asking about the status of compromisability of the given network node. Alternatively, the notifying may be automatically done by the remote computing device following the determination of compromisability of the given network node.

The embodiments disclosed hereinabove are effective, inter alia, to reduce the amount of network bandwidth and the amount of processing power consumed by the penetration testing campaign. This is achieved by converting some of the campaign network traffic into traffic between network nodes, typically between nodes sharing a common broadcast domain. Such local network traffic has low impact on the overall networked system, in contrast to traffic between network nodes and the remote computing device which is more voluminous in prior-art systems. Additionally, the conversion of traffic into traffic between nodes reduces the processing power requirements from the remote computing device in exchange to only a slight increase in the requirements from the processors of the network nodes.

Referring now to the figures, and in particular to FIG. 1, a functional block diagram of a penetration testing system 100 is shown according to some embodiments, comprising a reconnaissance function as defined as definition "14" in the Definitions Section later in this specification. The reconnaissance function includes functionality in reconnaissance agents 120 ($120_1$, $120_2$, . . . $120_N$) installed in respective network nodes 110 ($110_1$, $110_2$, . . . $110_N$) and, in some embodiments, also includes functionality in a remote computing device 180 in which is installed "part of reconnaissance function" 190. In some embodiments, an attack function 160, as defined as definition "15" in the Definitions Section, a reporting function 130 as defined as definition "16" in the Definitions Section, and optionally a recovery function 140 (also known in the industry as a 'clean-up' function and synonymous therewith), as defined as definition "17" in the Definitions Section, are all installed in the remote computing device 180. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 180, or, alternatively, the functionality of the remote computing device 180 of FIG. 1 is split between the physically-remote remote computing device 180 and the network nodes 110.

Figure 2:
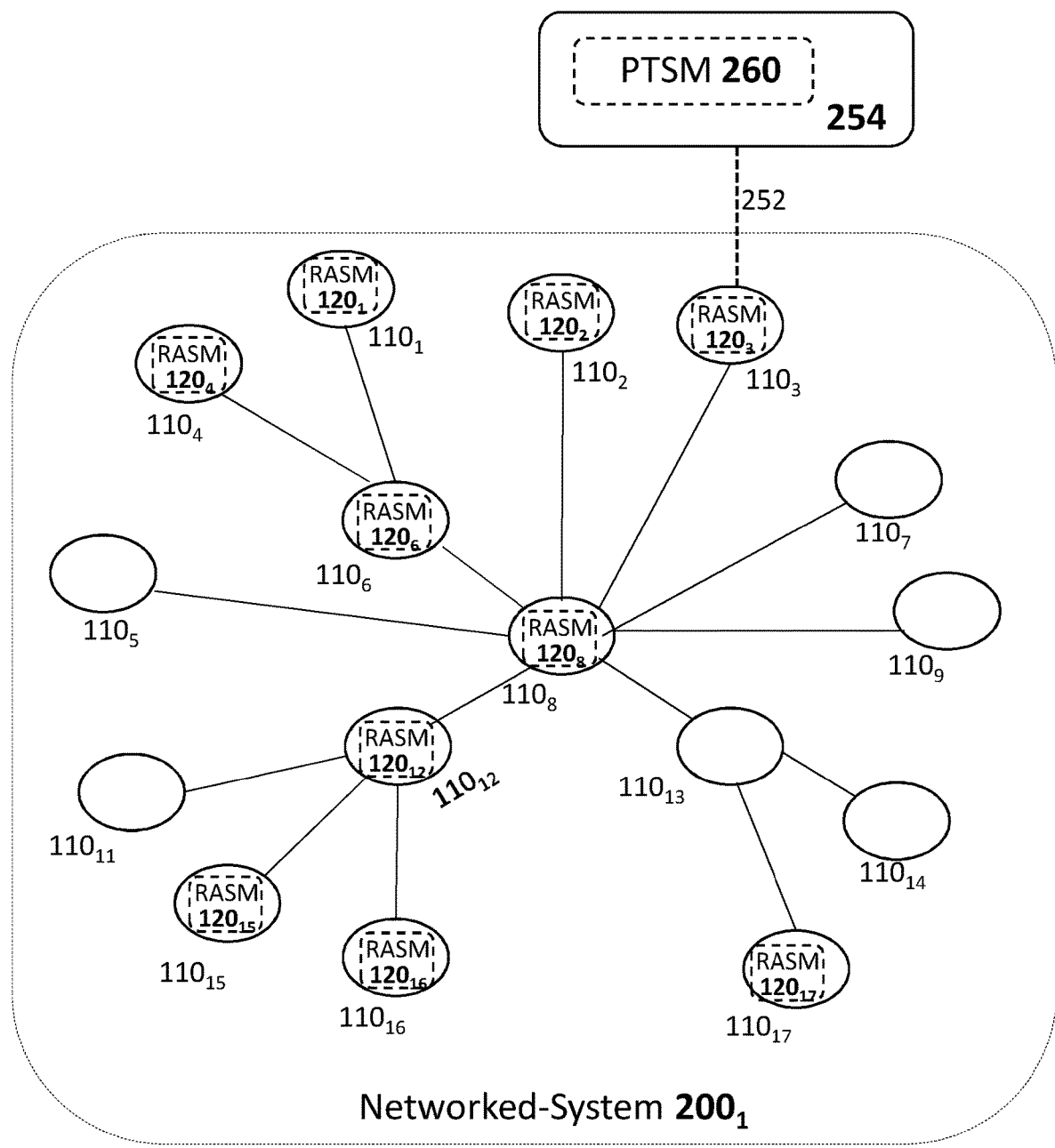
FIG. 2 shows a schematic illustration of a networked system that may be tested according to embodiments of the present invention, the networked system comprising multiple network nodes, some of which have a reconnaissance agent software module installed therein, and a computing device having a penetration testing software module installed therein and in connection with the networked system.

Referring now to FIG. 2, an example of a penetration testing system is illustrated schematically in accordance with embodiments of the invention. The penetration testing system comprises a penetration testing software module (PTSM) 260 installed on a computing device 254—in this example remote from the networked system—and a reconnaissance agent software module (RASM) 120 installed on at least some of a plurality of network nodes 110 of a networked system $200_1$.

The number of network nodes 110 can be as few as two and as many as several hundred or several thousand. They can be connected hierarchically, peer-to-peer, hub-and-spoke, or in any combination of connections as long as each networked node 110 is connected to at least one other node 110.

In the example of FIG. 2, the remote computing device 254 on which the PTSM 260 is installed is external to the networked system $200_1$ and is in communication with the networked system $200_1$ by an Internet connection 252. In this case, the physical location of remote computing device 254 is unimportant. It can be, by way of non-limiting examples, at a physical location belonging to a supplier or operator of a penetration testing system, in a 'cloud' server farm of an Internet services or cloud services provider, or it can be physically co-located with some or all of the network nodes 110.

Figure 3:
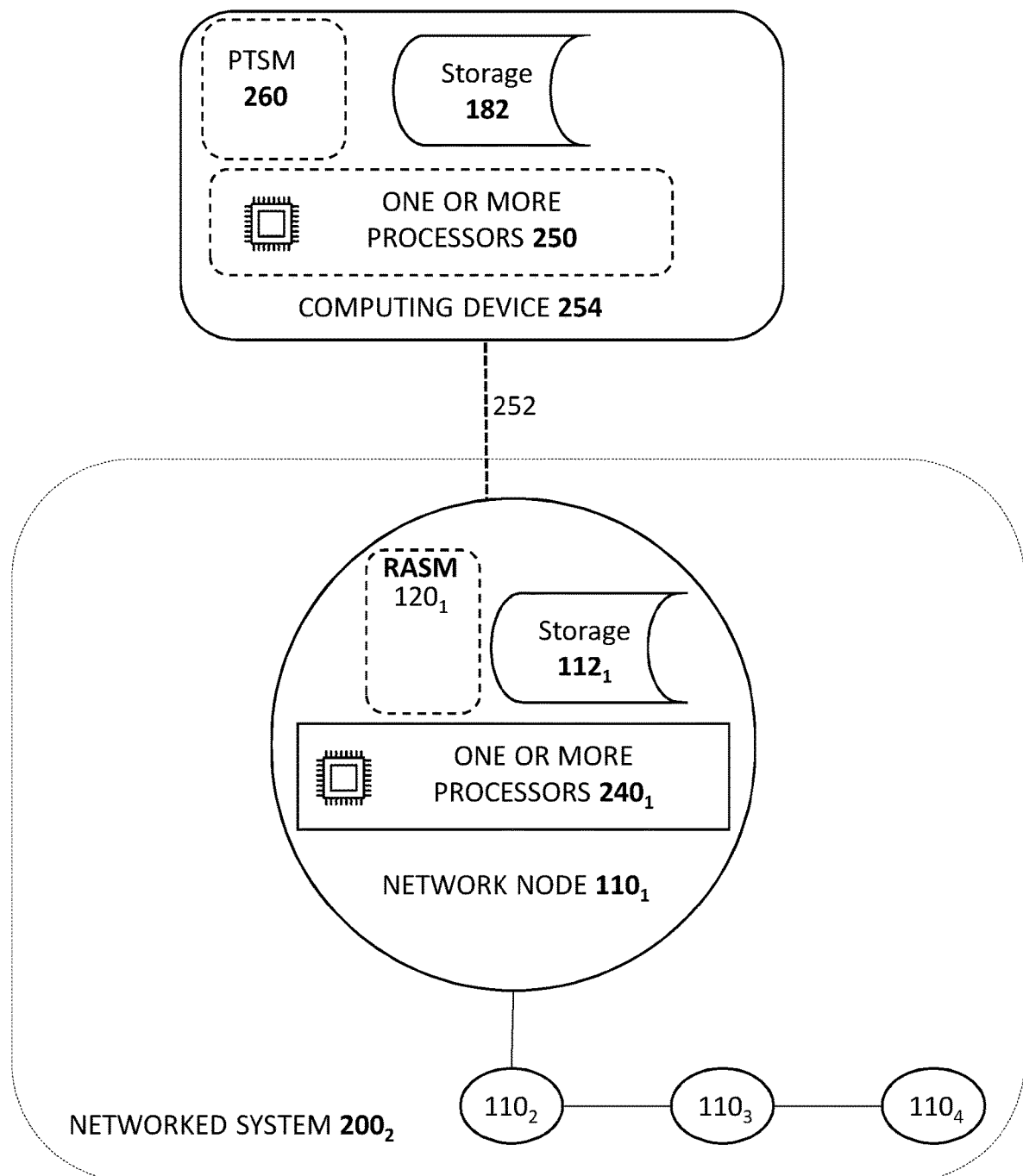
FIG. 3 shows a block diagram of a networked system having a first network node which has a reconnaissance agent software module installed therein, and a computing device having a penetration testing software module installed therein and in connection with the networked system, according to embodiments of the present invention.

Networked system $200_2$ of FIG. 3 includes a plurality of network nodes 110. Four nodes 110 ($110_1$, $110_2$, $110_3$ and $110_4$) are shown, but the networked system $200_2$ can include any number of nodes 110. The nodes 110 may be connected by a single network, but in some embodiments at least some of the nodes and respective connections can form sub-networks, so that the networked system $200_2$ is composed of multiple sub-networks that are in communication with each other. For example, nodes $110_2$ and $110_1$ may be a separate sub-network, with node $110_2$ being a gateway or a router for connecting to another sub-network. Reconnaissance agent software module $120_1$ is shown installed in the first network node $110_1$. As disclosed earlier, the RASM 120 can be installed in any or all of the network nodes 110. The RASM 120, or at least some program instructions thereof, can be stored in respective storage media 112 of corresponding network nodes 110.

Components of a penetration testing system, along with other hardware and software components related to the execution of a penetration testing campaign by a penetration testing system, are illustrated in FIG. 3. The penetration testing system itself comprises:

1. A computing device 254 comprising one or more processors 250, the computing device 254 in networked communication with at least some of the multiple network nodes 110 of the networked system $200_2$. The computing device 254 can be a remote computer as shown, or can be a computer selected from among the nodes 110 of the networked system $200_2$ or any other networked system 200.

Figure 4A:
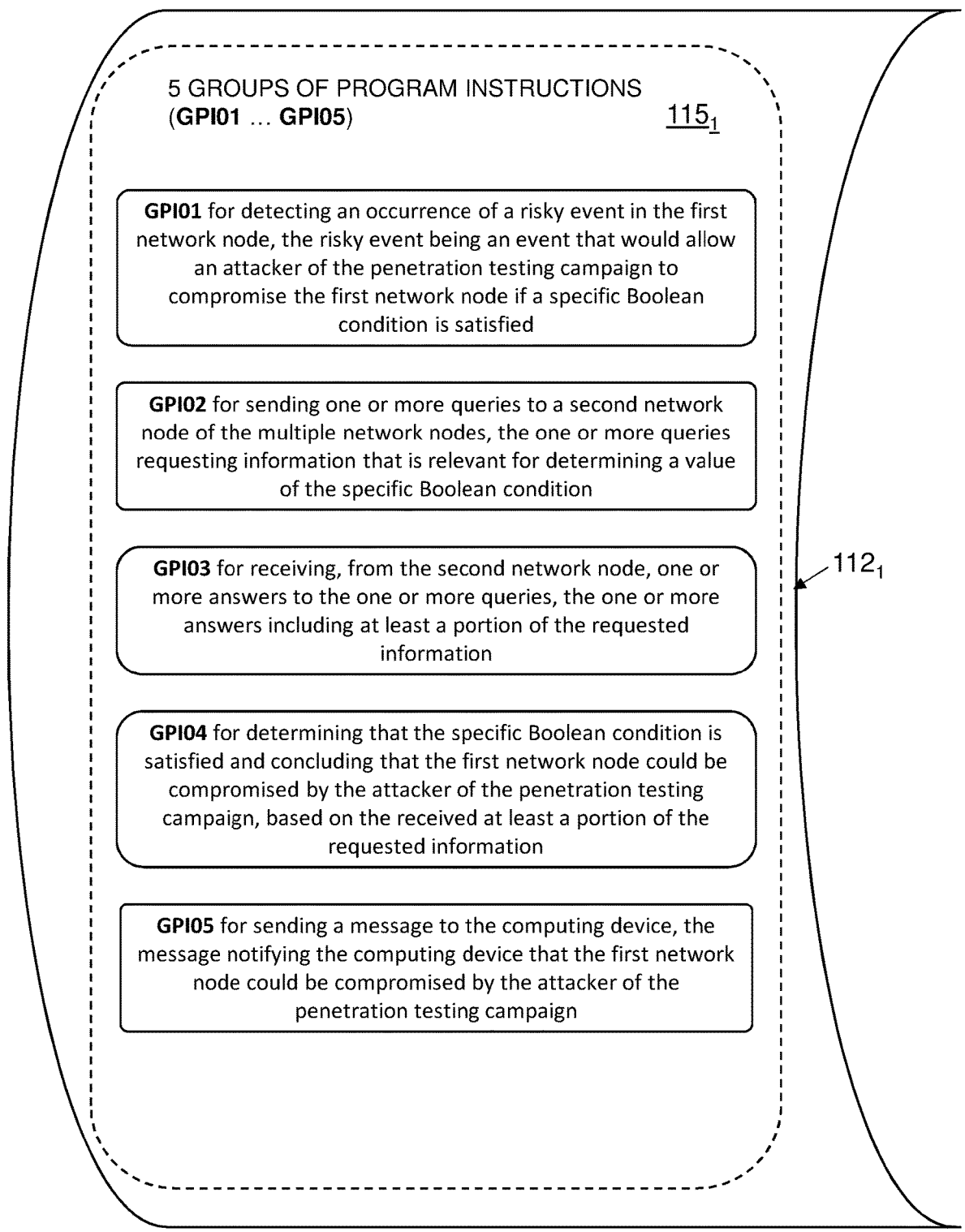
FIGS. 4A-4D are block diagrams of first non-transitory computer-readable storage media installed at the first node of FIG. 3, comprising respective program instructions, according to embodiments of the present invention.

2. A reconnaissance-agent non-transitory computer-readable storage medium $112_1$ which is associated with a first node $110_1$. This first storage medium $112_1$ is provided for storage of first instructions $115_1$ of the reconnaissance agent software module for execution by one or more processors $240_1$ of the first network node $110_1$, which is in electronic communication with the computing device 254 (by communications arrangement 252 which can be an Internet connection or a LAN connection or any other suitable connection, including an indirect connection). A reconnaissance agent software module (RASM) $120_1$ is installed in the network node $110_1$. The first storage medium $112_1$ is shown for convenience as being part of the network node $110_1$ but it can be anywhere as long as the one or more processors $240_1$ can access and execute the instructions $115_1$ stored therein. As shown in the block diagram of FIG. 4A, the first instructions $115_1$ stored in first reconnaissance-agent non-transitory computer-readable storage medium $112_1$, comprise five groups of program instructions GPI01 ... GPI05 for execution by the one or more processors $240_1$ of the network node $110_1$:

Program Instructions GPI01 for detecting an occurrence of a risky event in the first network node $110_1$, the risky event being an event that would allow an attacker of the penetration testing campaign to compromise the first network node $110_1$ if a specific Boolean condition is satisfied. In some embodiments, the risky event includes an execution of an executable file retrieved from a shared folder. In some embodiments, the risky event includes a transmission of a network message of a given type. In some embodiments, the risky event includes an insertion of a removable storage device into a connector of the first network node $110_1$.

Program Instructions GP102 for sending one or more queries to a second network node $110_2$ of the multiple network nodes 110, the one or more queries requesting information that is relevant for determining a value of the specific Boolean condition. In some embodiments, the requested information that is relevant for determining the value of the specific Boolean condition includes information about the respective value of each of one or more variables, where each of the one or more variables is a Boolean variable or a numerical variable. In some embodiments, the one or more queries consist of a single query which is requesting information about the respective values of multiple variables of the one or more variables. In some embodiments, the one or more queries consist of multiple queries, where each query of the multiple queries is requesting information about the respective value of a single variable of the one or more variables. In some embodiments, (i) the one or more queries consist of multiple queries, and (ii) for a first query and a second query of the multiple queries, the second query is sent only after receiving an answer to the first query from the second network node $110_2$. It can be that the second query is sent only if the answer to the first query includes information that satisfies a given condition. In some embodiments, the one or more variables include a Boolean variable whose value is true if and only if the second network node $110_2$ is already known to be compromisable by the attacker of the penetration testing campaign. In some embodiments, the one or more variables consist of a single Boolean variable. In some embodiments, the one or more variables include a Boolean variable whose value is true if and only if the second network node $110_2$ has write access rights to a given shared folder. In some embodiments, the one or more variables include a variable whose respective value may change during the penetration testing campaign. In some embodiments, the one or more variables include a Boolean variable whose value is true if and only if a given removable storage device had been inserted into the second network node $110_2$ during the penetration testing campaign. In some embodiments, the one or more variables include a numerical variable whose value indicates a count of occurrences of a given event. In some embodiments, the one or more queries are sent only to the second network node. In some embodiments, the one or more queries are sent to all network nodes sharing a broadcast domain with the first network node $110_1$. In some embodiments, for at least a given part of the requested information, the one or more processors $240_1$ of the first network node $110_1$ interpret a lack of an answer from the second network node $110_2$ regarding the given part as receiving a pre-defined default answer for the given part. In some embodiments, at least a part of the at least a portion of the requested information is locally determined at the second network node $110_2$ without receiving it from another computing device. In some such embodiments, the at least a part of the at least a portion of the requested information includes information about whether the second network node $110_2$ is already known to be compromisable by the attacker of the penetration testing campaign. In some embodiments, the sending of the one or more queries is done in response to the detecting of the risky event.

Program Instructions GPI03 for receiving, from the second network node $110_2$, one or more answers to the one or more queries, the one or more answers including at least a portion of the requested information. In some embodiments, the received at least a portion of the requested information includes the respective values of at least some of the one or more variables. In some embodiments, at least a part of the at least a portion of the requested information is received, by the second network node $110_2$, from another computing device. In some such embodiments, the other computing device is the computing device 254 that is in networked communication with at least some of the multiple network nodes 110. Also in some such embodiments, the at least a part of the at least a portion of the requested information includes information about whether the second network node $110_2$ is already known to be compromisable by the attacker of the penetration testing campaign.

Program Instructions GPI04 for determining that the specific Boolean condition is satisfied and concluding that the first network node $110_1$ could be compromised by the attacker of the penetration testing campaign, based on the received at least a portion of the requested information. In some embodiments, the determining that the specific Boolean condition is satisfied is based on the received respective values of the at least some of the one or more variables. In some embodiments, a necessary condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$. In some embodiments, a necessary and sufficient condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$.

Program Instructions GPI05 for sending a message to the computing device 254, the message notifying the computing device 254 that the first network node $110_1$ could be compromised by the attacker of the penetration testing campaign.

Figure 4B:
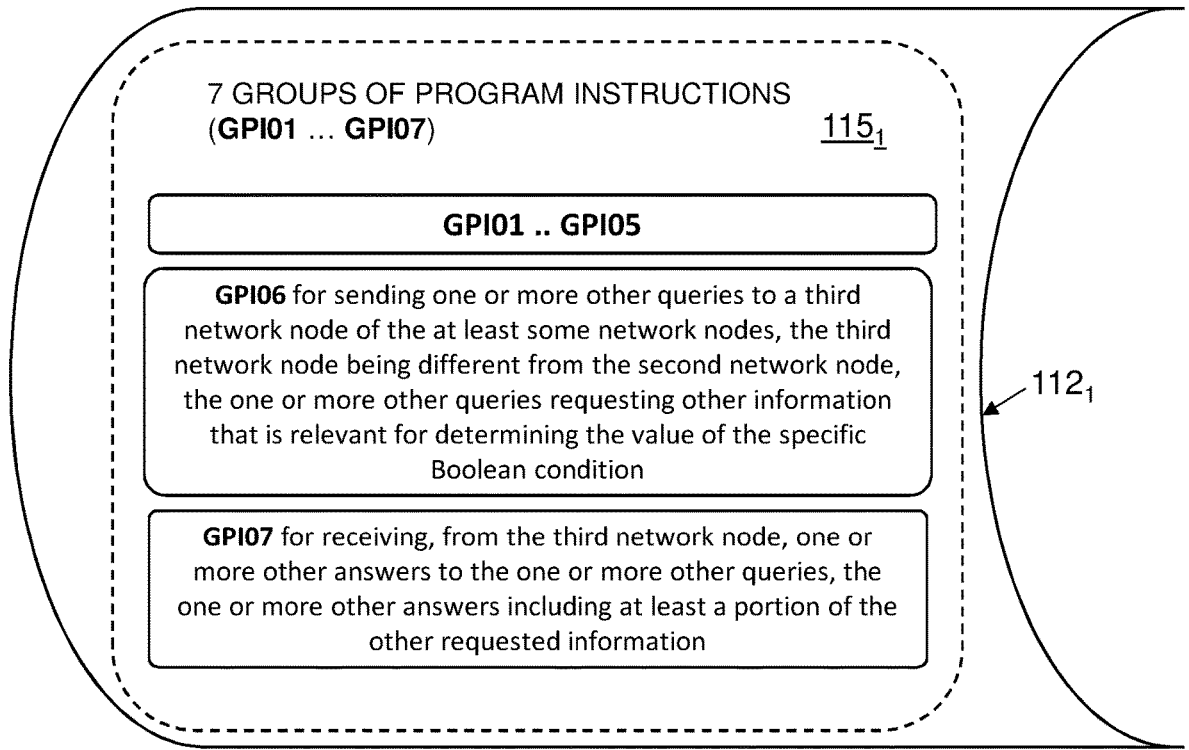

In some embodiments, the first instructions $115_1$ stored in first reconnaissance-agent non-transitory computer-readable storage medium $112_1$, comprise two additional groups of program instructions GPI06, GPI07, as illustrated in FIG. 4B, for execution by the one or more processors $240_1$ of the first network node $110_1$:

Program Instructions GPI06 for sending one or more other queries to a third network node $110_3$ of the at least some network nodes 110, the third network node $110_3$ being different from the second network node $110_2$, the one or more other queries requesting other information that is relevant for determining the value of the specific Boolean condition.

Program Instructions GPI07 for receiving, from the third network node $110_3$, one or more other answers to the one or more other queries, the one or more other answers including at least a portion of the other requested information.

In such embodiments, the determining (See GPI04), by the reconnaissance agent software module installed on the first network node $110_1$, that the specific Boolean condition is satisfied, is further based on the at least a portion of the other requested information.

Figure 4C:
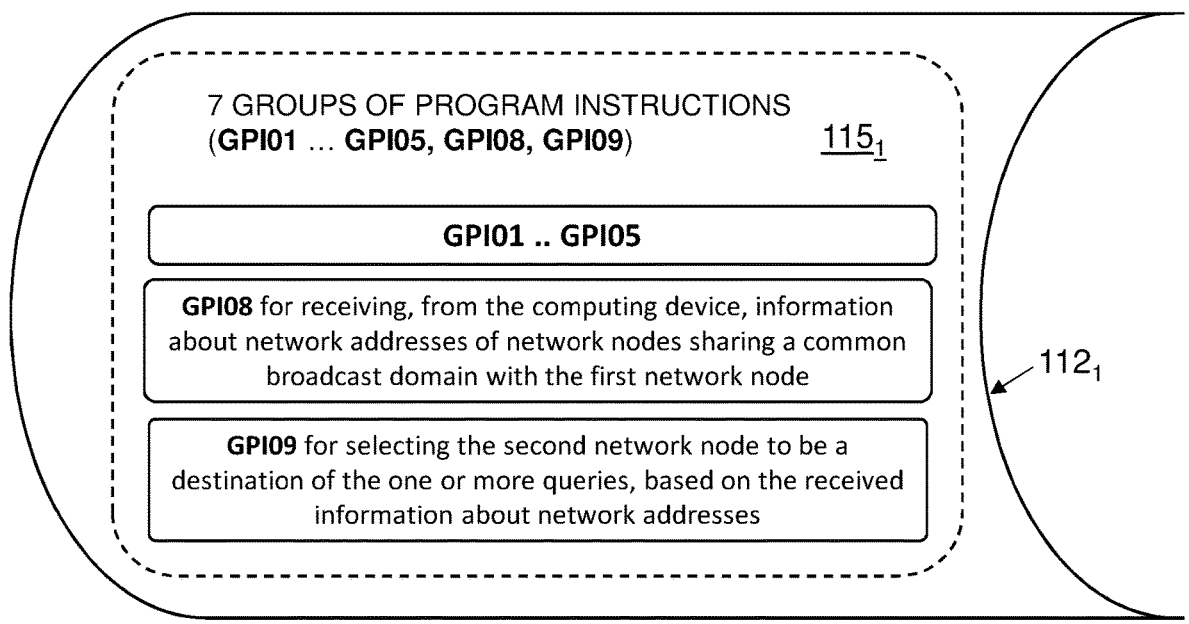

In some embodiments, the first instructions $115_1$ stored in first reconnaissance-agent non-transitory computer-readable storage medium $112_1$, comprise two additional groups of program instructions GPI08, GPI09, illustrated in FIG. 4C, for execution by the one or more processors $240_1$ of the first network node $110_1$:

Program Instructions GPI08 for receiving, from the computing device 254, information about network addresses of network nodes 110 sharing a common broadcast domain with the first network node $110_1$ Program Instructions GPI09 for selecting the second network node $110_2$ to be a destination of the one or more queries, based on the received information about network addresses.

Figure 4D:
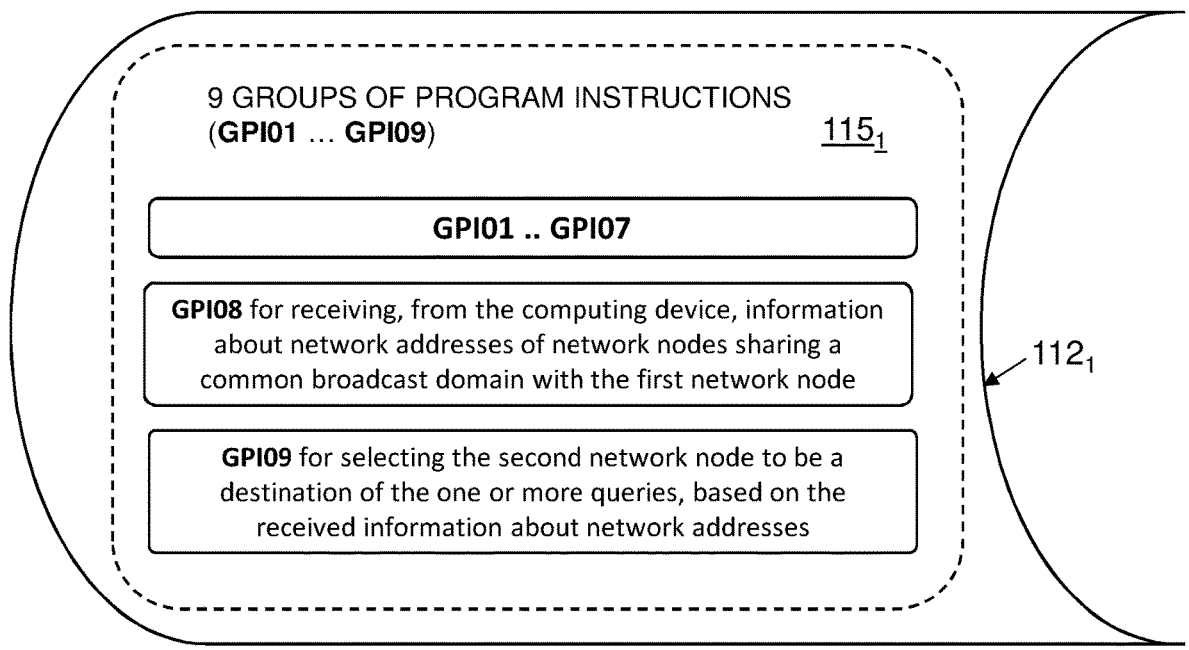

In some embodiments, the first instructions $115_1$ stored in first reconnaissance-agent non-transitory computer-readable storage medium $112_1$, comprise all nine groups of programs instructions described above, GPI01 . . . GPI09, as illustrated in FIG. 4D.

Figure 5:
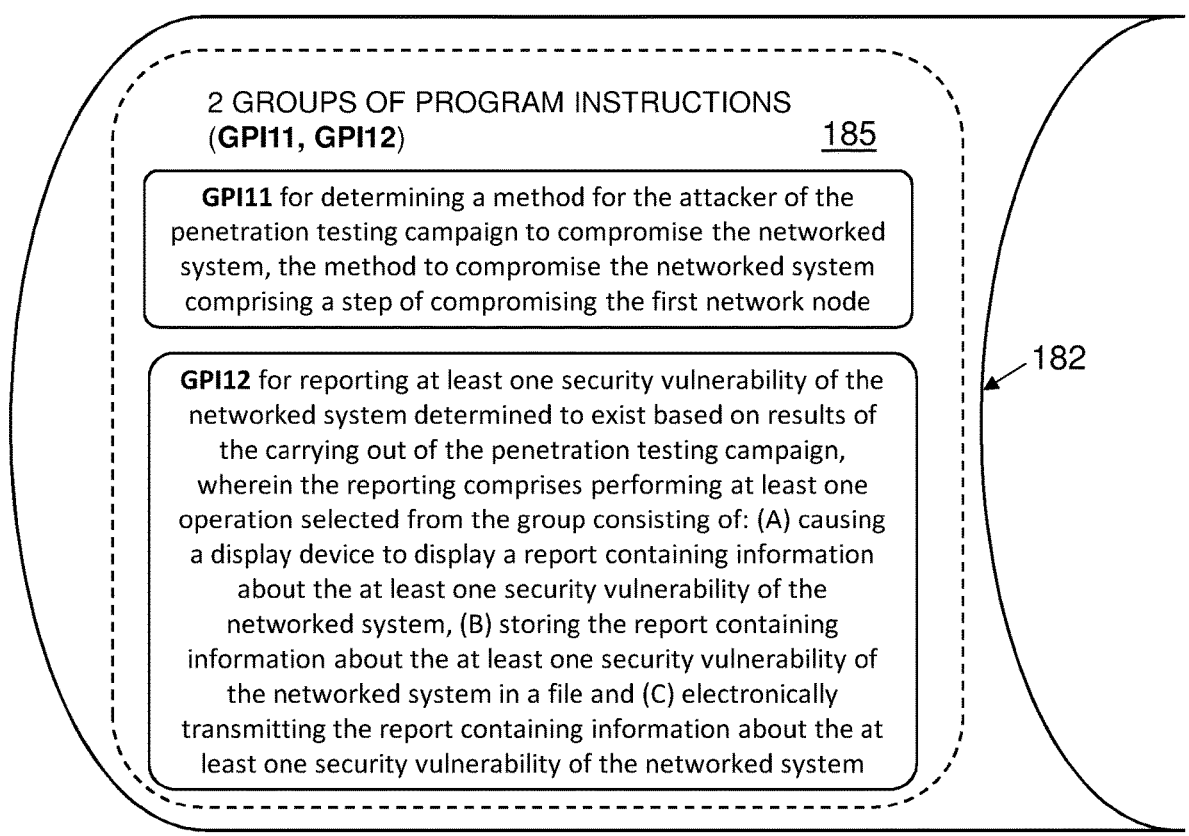
FIG. 5 shows a block diagram of a non-transitory computer-readable storage medium installed at the computing device of FIG. 3, comprising groups of program instructions, according to embodiments of the present invention.

3. A penetration-testing non-transitory computer-readable storage medium 182 for storage of instructions 185 of the penetration testing software module (PTSM) 260 for execution by one or more processors 250 of the remote computing device 254. The penetration testing software module 260 is installed in the computing device 254. The storage medium 182 is also shown for convenience as being part of the computing device 254 but it can be anywhere as long as the one or more processors 250 can access and execute the instructions 185 stored therein. The PTSM 260 can be stored, at least in part, in storage medium 182. As illustrated in the block diagram of FIG. 5, the program instructions 185 comprise 2 groups of program instructions GPI11, GPI12 for execution by the one or more processors 250 of the computing device 254:

Program Instructions GPI11 for determining a method for the attacker of the penetration testing campaign to compromise the networked system 200, the method to compromise the networked system 200 comprising a step of compromising the first network node $110_1$ Program Instructions GPI12 for reporting at least one security vulnerability of the networked system 200 determined to exist based on results of the carrying out of the penetration testing campaign, wherein the reporting comprises performing at least one operation selected from the group consisting of: (A) causing a display device to display a report containing information about the at least one security vulnerability of the networked system 200, (B) storing the report containing information about the at least one security vulnerability of the networked system 200 in a file and (C) electronically transmitting the report containing information about the at least one security vulnerability of the networked system 200.

Referring now to FIG. 6A, a method is disclosed for carrying out a penetration testing campaign of a networked system 200 (for example, networked system $200_2$ of FIG. 3) by a simulative penetration testing system 100. A non-limiting example of a penetration testing system suitable for carrying out the method is one that comprises (A) a penetration testing software module (PTSM) 260 installed on a remote computing device 254 and (B) a reconnaissance agent software module (RASM) 120 installed on at least a first network node $110_1$ and a second network node $110_2$ of the networked system. As illustrated by the flow chart in FIG. 6A, the method comprises:

Step S01 detecting, by the RASM $120_1$ installed on a first network node 110 of the at least some network nodes 110, an occurrence of a risky event in the first network node $110_1$, the risky event being an event that would allow an attacker of the penetration testing campaign to compromise the first network node $110_1$ if a specific Boolean condition is satisfied. In some embodiments, the risky event includes an execution of an executable file retrieved from a shared folder. In some embodiments, the risky event includes a transmission of a network message of a given type. In some embodiments, the risky event includes an insertion of a removable storage device into a connector of the first network node $110_1$.

Step S02 sending, by the RASM $120_1$ installed on the first network node $110_1$, one or more queries to a second network node $110_2$ of the at least some network nodes 110, the one or more queries requesting information that is relevant for determining a value of the specific Boolean condition. In some embodiments, the requested information that is relevant for determining the value of the specific Boolean condition includes information about the respective value of each of one or more variables, where each of the one or more variables is a Boolean variable or a numerical variable. In some embodiments, the one or more queries consist of a single query which is requesting information about the respective values of multiple variables of the one or more variables. In some embodiments, the one or more queries consist of multiple queries, where each query of the multiple queries is requesting information about the respective value of a single variable of the one or more variables. In some embodiments, (i) the one or more queries consist of multiple queries, and (ii) for a first query and a second query of the multiple queries, the second query is sent only after receiving an answer to the first query from the second network node $110_2$. It can be that the second query is sent only if the answer to the first query includes information that satisfies a given condition. In some embodiments, the one or more variables include a Boolean variable whose value is true if and only if the second network node $110_2$ is already known to be compromisable by the attacker of the penetration testing campaign. In some embodiments, the one or more variables consist of a single Boolean variable. In some embodiments, the one or more variables include a Boolean variable whose value is true if and only if the second network node $110_2$ has write access rights to a given shared folder. In some embodiments, the one or more variables include a variable whose respective value may change during the penetration testing campaign. In some embodiments, the one or more variables include a Boolean variable whose value is true if and only if a given removable storage device had been inserted into the second network node $110_2$ during the penetration testing campaign. In some embodiments, the one or more variables include a numerical variable whose value indicates a count of occurrences of a given event. In some embodiments, the one or more queries are sent only to the second network node. In some embodiments, the one or more queries are sent to all network nodes sharing a broadcast domain with the first network node $110_1$. In some embodiments, for at least a given part of the requested information, the one or more processors $240_1$ of the first network node $110_1$ interpret a lack of an answer from the second network node $110_2$ regarding the given part as receiving a pre-defined default answer for the given part. In some embodiments, at least a part of the at least a portion of the requested information is locally determined at the second network node $110_2$ without receiving it from another computing device. In some such embodiments, the at least a part of the at least a portion of the requested information includes information about whether the second network node $110_2$ is already known to be compromisable by the attacker of the penetration testing campaign. In some embodiments, the sending of the one or more queries is done in response to the detecting of the risky event.

Step S03 receiving, by the RASM $120_1$ installed on the first network node $110_1$ and from the RASM $120_2$ installed on the second network node $110_2$, one or more answers to the one or more queries sent in Step S02, the one or more answers including at least a portion of the requested information. In some embodiments, the received at least a portion of the requested information includes the respective values of at least some of the one or more variables. In some embodiments, at least a part of the at least a portion of the requested information is received, by the second network node $120_2$, from another computing device. In some such embodiments, the other computing device is the computing device 254 that is in networked communication with at least some of the multiple network nodes 110. Also in some such embodiments, the at least a part of the at least a portion of the requested information includes information about whether the second network node $110_2$ is already known to be compromisable by the attacker of the penetration testing campaign.

Step S04 based on the received at least a portion of the requested information, determining, by the RASM $120_1$ installed on the first network node $110_1$, that the specific Boolean condition is satisfied and concluding that the first network node $110_1$ could be compromised by the attacker of the penetration testing campaign. In some embodiments, the determining that the specific Boolean condition is satisfied is based on the received respective values of the at least some of the one or more variables. In some embodiments, a necessary condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$. In some embodiments, a necessary and sufficient condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$.

Step S05 sending, by the RASM $120_1$ installed on the first network node, a message to the remote computing device 254, the message notifying the remote computing device 254 that the first network node $110_1$ could be compromised by the attacker of the penetration testing campaign.

Step S06 determining, by the PTSM 260, a method for the attacker of the penetration testing campaign to compromise the networked system 200, the method to compromise the networked system 200 comprising a step of compromising the first network node $110_1$.

Step S07 reporting, by the PTSM 260, at least one security vulnerability of the networked system 200 determined to exist based on results of the carrying out of the penetration testing campaign, wherein the reporting comprises performing at least one operation selected from the group consisting of: (i) causing a display device to display a report containing information about the at least one security vulnerability of the networked system 200, (ii) storing the report containing information about the at least one security vulnerability of the networked system 200 in a file and (iii) electronically transmitting the report containing information about the at least one security vulnerability of the networked system.

Figure 6B:
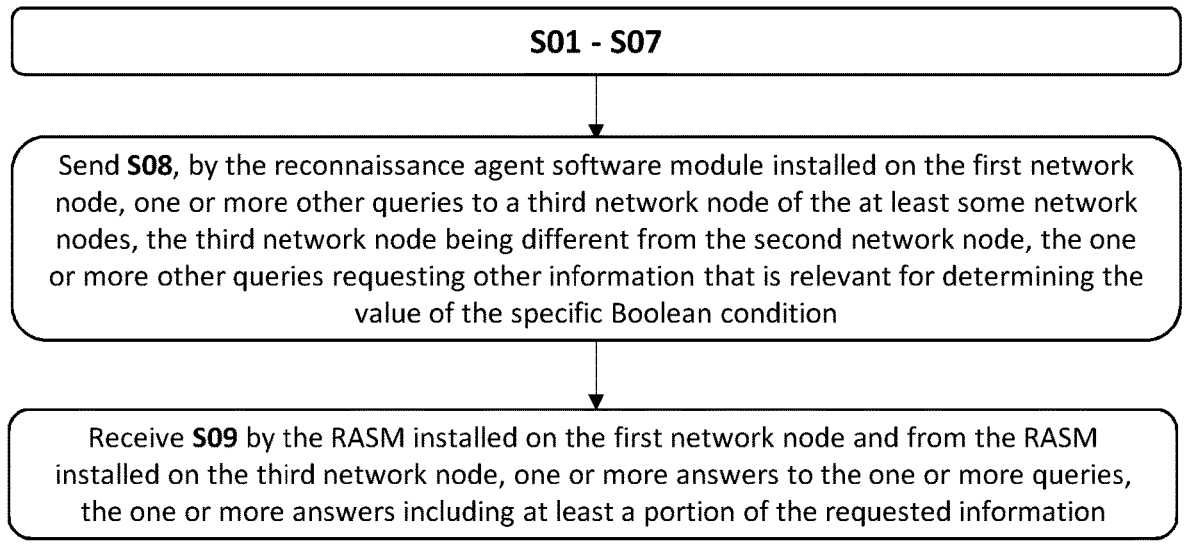

In some embodiments, the method includes two additional steps S08 and S09, as illustrated in FIG. 6B:

Step S08 sending, by the reconnaissance agent software module installed on the first network node, one or more other queries to a third network node of the at least some network nodes, the third network node being different from the second network node, the one or more other queries requesting other information that is relevant for determining the value of the specific Boolean condition.

Step S09 receiving, by the reconnaissance agent software module installed on the first network node and from the reconnaissance agent software module installed on the third network node, one or more other answers to the one or more other queries, the one or more other answers including at least a portion of the other requested information.

In such embodiments, the determining of Step S04 by the reconnaissance agent software module installed on the first network node, that the specific Boolean condition is satisfied, is further based on the at least a portion of the other requested information.

Figure 6C:
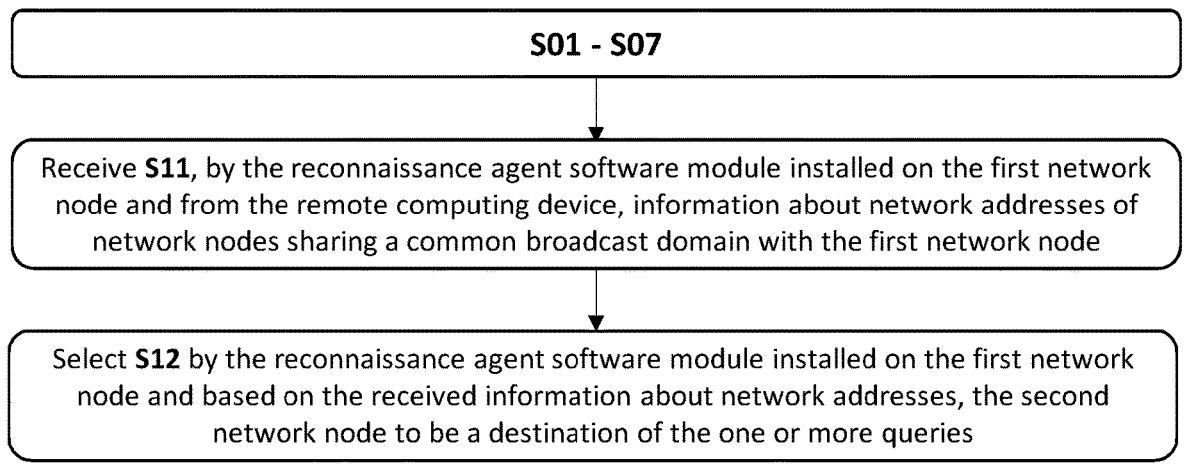

In some embodiments, the method includes two additional steps S11 and S12, as illustrated in FIG. 6C:

Step S10 receiving, by the reconnaissance agent software module installed on the first network node and from the remote computing device, information about network addresses of network nodes sharing a common broadcast domain with the first network node.

Step S11 based on the received information about network addresses, selecting, by the reconnaissance agent software module installed on the first network node, the second network node to be a destination of the one or more queries.

Figure 6D:
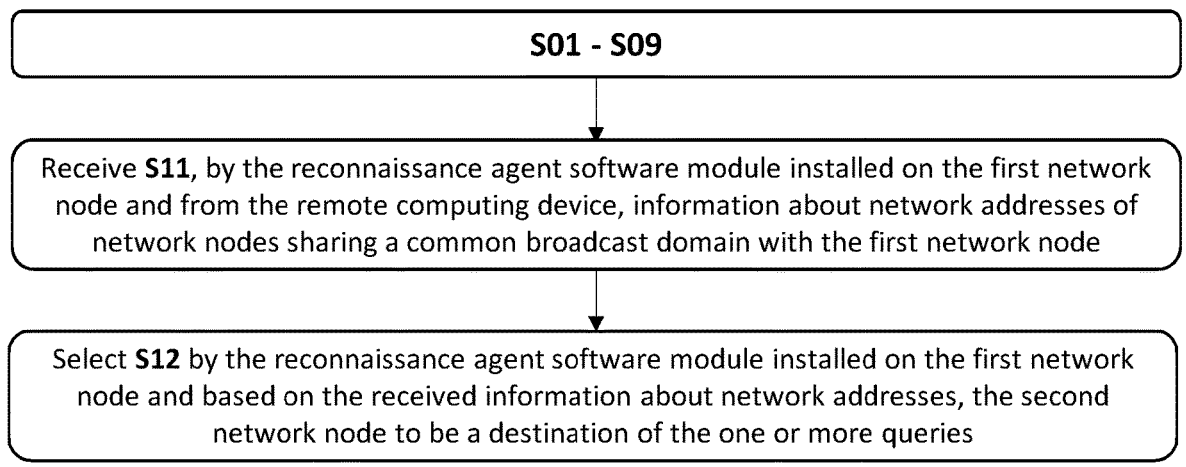

In some embodiments, the method includes all of the above steps S01-S09 and S10-S11, as illustrated in FIG. 6D.

Figure 7:
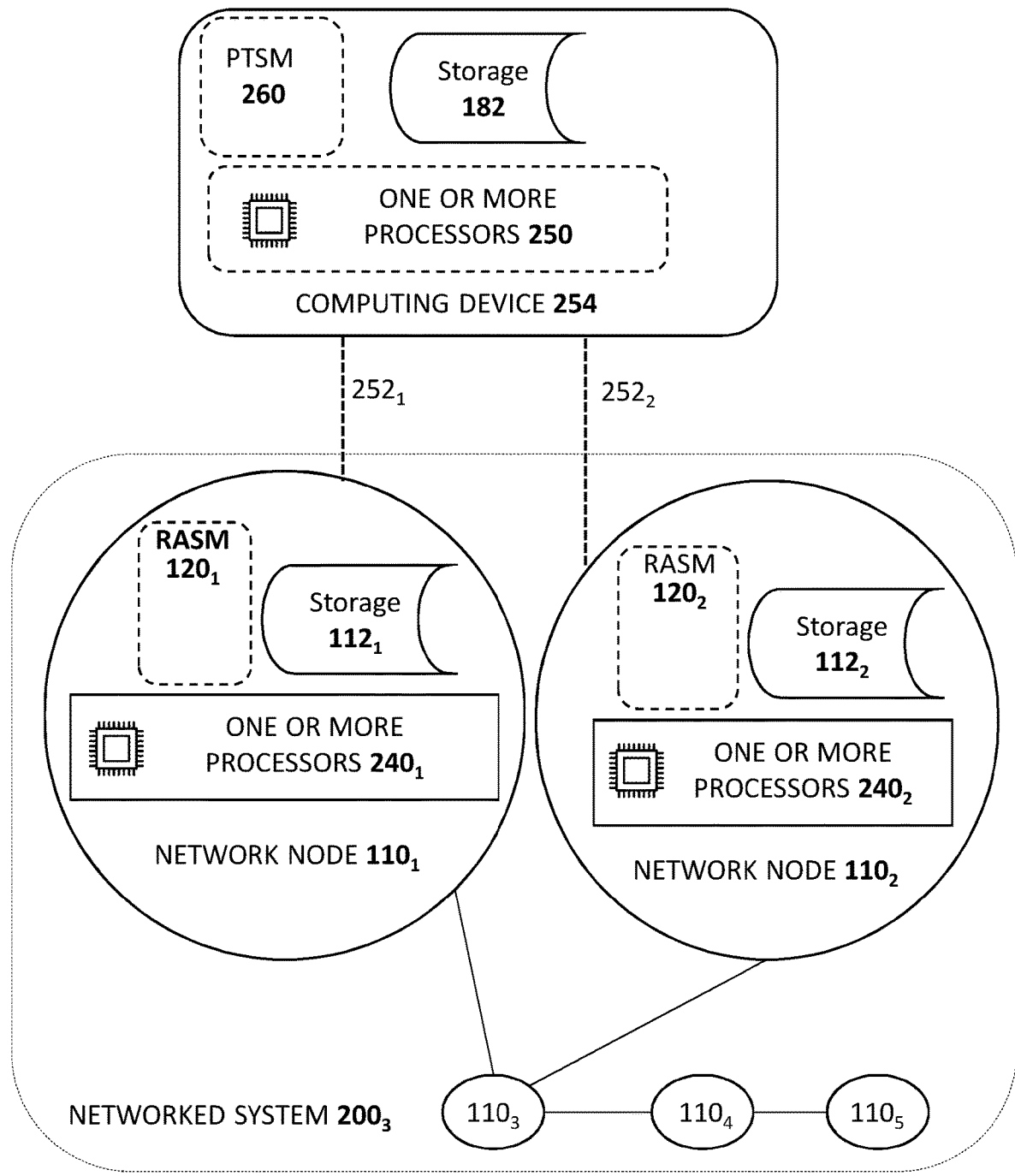
FIG. 7 shows a block diagram of a networked system having first and second network nodes each of which has a reconnaissance agent software module installed therein, and a computing device having a penetration testing software module installed therein and in connection with the networked system, according to embodiments of the present invention.

Networked system 200$_3$ of FIG. 7 includes a plurality of network nodes 110. Five nodes 110 ($110_1$, $110_2$, $110_3$, $110_4$ and $110_5$) are shown, but the networked system 200$_3$ can include any number of nodes 110. The nodes 110 may be connected by a single network, but in some embodiments at least some of the nodes and respective connections can form sub-networks, so that the networked system 200$_3$ is composed of multiple sub-networks that are in communication with each other. For example, nodes $110_3$, $110_2$ and $110_1$ may be a separate sub-network, with node $110_3$ being a gateway or a router for connecting to another sub-network. Reconnaissance agent software module (RASM) $120_1$ is installed in the first network node $110_1$. As disclosed earlier, the RASM 120 can be installed in any or all of the network nodes 110. The RASMs 120, or at least some program instructions thereof, can be stored in respective storage media 112 of corresponding network nodes 110.

Figure 8A:
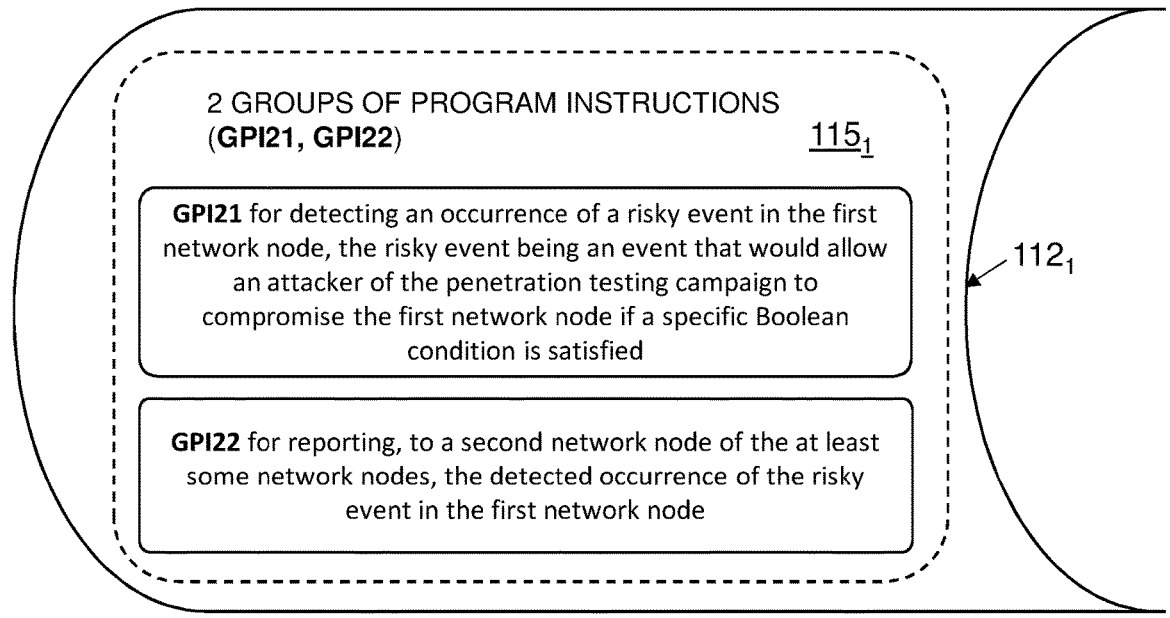
FIGS. 8A-8E are block diagrams of non-transitory computer-readable storage media installed at the first and second network nodes of FIG. 7, comprising respective program instructions, according to embodiments of the present invention.

Components of a penetration testing system, along with other hardware and software components related to the execution of a penetration testing campaign by a penetration testing system, are illustrated in FIG. 7. The penetration testing system comprises:

1. A computing device 254 comprising one or more processors 250, the computing device 254 in networked communication with at least some of the multiple network nodes 110 of the networked system 200.
2. A first reconnaissance-agent non-transitory computer-readable storage medium $112_1$ which is associated with a first node $110_1$. This first storage medium $112_1$ is provided for storage of first instructions $115_1$ of the reconnaissance agent software module for execution by one or more processors $240_1$ of the first network node $110_1$, which is in electronic communication with the computing device 254 (by communications arrangement $252_1$ which can be an Internet connection or a LAN connection or any other suitable connection, including an indirect connection). The computing device 254 can be a remote computer as shown, or can be a computer selected from among the nodes 110 of the networked system 200$_3$. A reconnaissance agent software module (RASM) $120_1$ is installed in the network node $110_1$. The first storage medium $112_1$ is shown for convenience as being part of the network node $110_1$ but it can be anywhere as long as the one or more processors $240_1$ can access and execute the first instructions $115_1$ stored therein. As shown in the block diagram of FIG. 8A, the first instructions $115_1$ stored in first reconnaissance-agent non-transitory computer-readable storage medium $112_1$, comprise 2 groups of program instructions GPI21, GPI22 for execution by the one or more processors $240_1$ of the network node $110_1$:

Program Instructions GPI21 for detecting an occurrence of a risky event in the first network node $110_1$, the risky event being an event that would allow an attacker of the penetration testing campaign to compromise the first network node $110_1$ if a specific Boolean condition is satisfied. In some embodiments, the risky event includes an execution of an executable file retrieved from a shared folder. In some embodiments, the risky event includes a transmission of a network message of a given type. In some embodiments, the risky event includes an insertion of a removable storage device into a connector of the first network node $110_1$.

Program Instructions GPI22 for reporting, to a second network node $110_2$ of the at least some network nodes 110, the detected occurrence of the risky event in the first network node $110_1$. In some embodiments, the reporting of the detected occurrence of the risky event in the first network node $110_1$ is sent in a message that is addressed only to the second network node $110_2$. In some embodiments, the reporting of the detected occurrence of the risky event in the first network node $110_1$ is sent in a broadcast message that is addressed to all network nodes 110 sharing a broadcast domain with the first network node $110_1$. In some embodiments, the reporting of the detected occurrence of the risky event in the first network node is done in response to the detecting of the risky event.

Figure 8B:
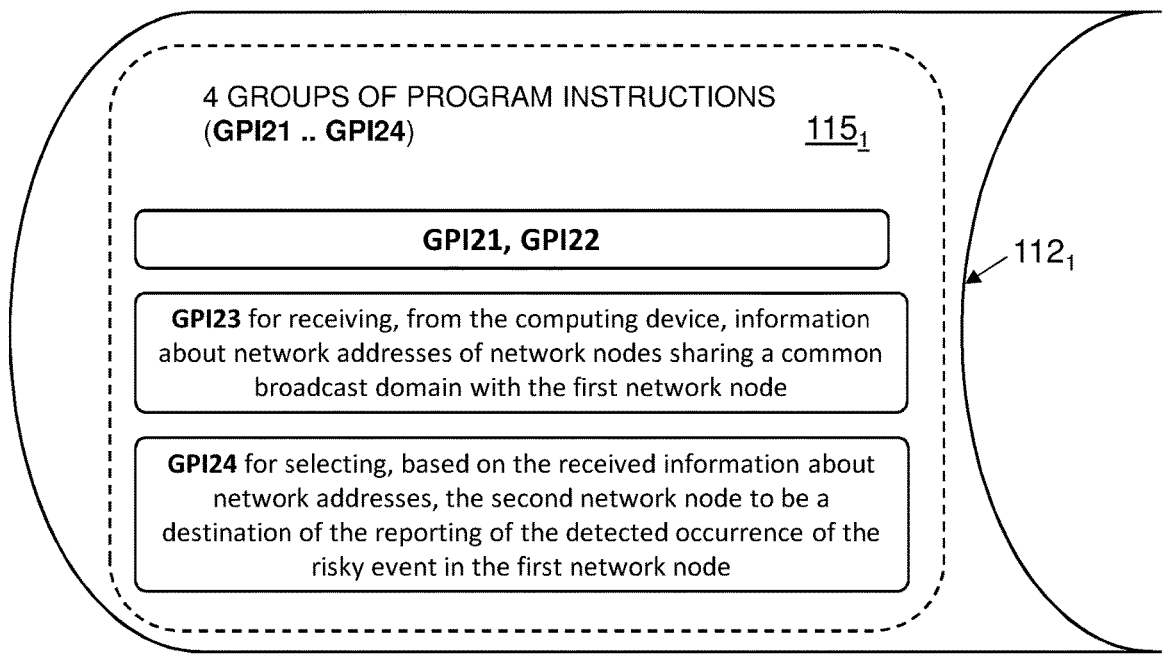

In some embodiments, the first instructions $115_1$ stored in first reconnaissance-agent non-transitory computer-readable storage medium $112_1$, comprise two additional groups of program instructions GPI23, GPI24, as illustrated in FIG. 8B, for execution by the one or more processors $240_1$ of the first network node $110_1$:

Program Instructions GPI23 for receiving, from the computing device 254, information about network addresses of network nodes 110 sharing a common broadcast domain with the first network node $110_1$.

Program Instructions GPI24 for selecting, based on the received information about network addresses, the second network node $110_2$ to be a destination of the reporting of the detected occurrence of the risky event in the first network node $110_1$.

Figure 8C:
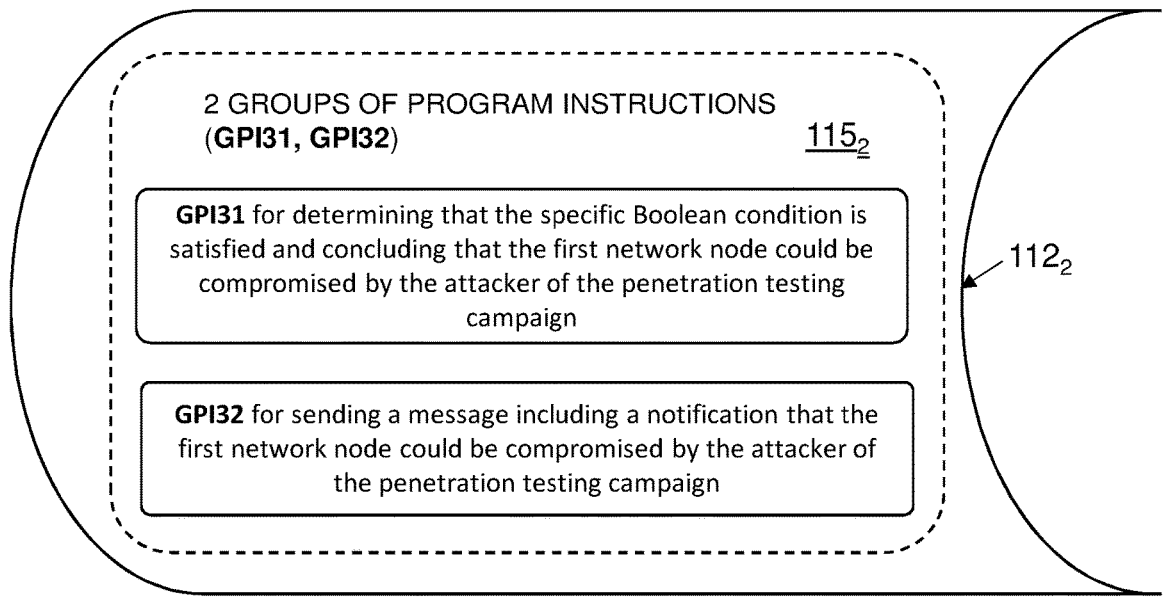

3. A second reconnaissance-agent non-transitory computer-readable storage medium $112_2$ which is associated with the second node $110_2$. This second storage medium $112_2$ is provided for storage of instructions $115_2$ of the reconnaissance agent software module for execution by one or more processors $240_2$ of the second network node $110_2$, which is also in electronic communication with computing device 254 (by communications arrangement $252_2$ which can be the same as communications arrangement $252_1$ or separate and/or different). A reconnaissance agent software module (RASM) $120_2$ is installed in the network node $110_2$. The second storage medium $112_2$ is also shown for convenience as being part of the network node $110_2$ but it can be anywhere as long as the one or more processors $240_2$ can access and execute the instructions $115_2$ stored therein. As shown in the block diagram of FIG. 8C, the second instructions $115_2$ stored in second reconnaissance-agent non-transitory computer-readable storage medium $112_2$, comprise two groups of program instructions GPI31, GPI32 for execution by the one or more processors $240_2$ of the given network node $110_2$:

Program Instructions GPI31 for determining that the specific Boolean condition is satisfied and concluding that the first network node $110_1$ could be compromised by the attacker of the penetration testing campaign. In some embodiments, a necessary condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$. In some embodiments, a necessary and sufficient condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$. In some embodiments, the determining that the specific Boolean condition is satisfied, is based on whether the second network node $110_2$ is already known to be compromisable by the attacker of the penetration testing campaign. In some embodiments, the determining that the specific Boolean condition is satisfied, is based on whether the second network node $110_2$ has write access rights to a given shared folder. In some embodiments, the determining that the specific Boolean condition is satisfied, is based on whether a given removable storage device had been inserted into the second network node $110_2$ during the penetration testing campaign. In some embodiments, the determining that the specific Boolean condition is satisfied, is based only on information locally available in the second network node $110_2$ at the time of receiving, in the second network node $110_2$, a message reporting the occurrence of the risky event in the first network node $110_1$. In some such embodiments, the information locally available in the second network node $110_2$ at the time of receiving the message reporting the occurrence of the risky event in the first network node $110_1$ includes information about whether the second network node $110_2$ is already known to be compromisable by the attacker of the penetration testing campaign. In some embodiments, the determining that the specific Boolean condition is satisfied, is based on information received in the second network node $110_2$ from another computing device subsequent to the time of receiving, in the second network node $110_2$, the message reporting the occurrence of the risky event in the first network node $110_1$. In some such embodiments, the other computing device is the computing device 254.

Figure 8D:
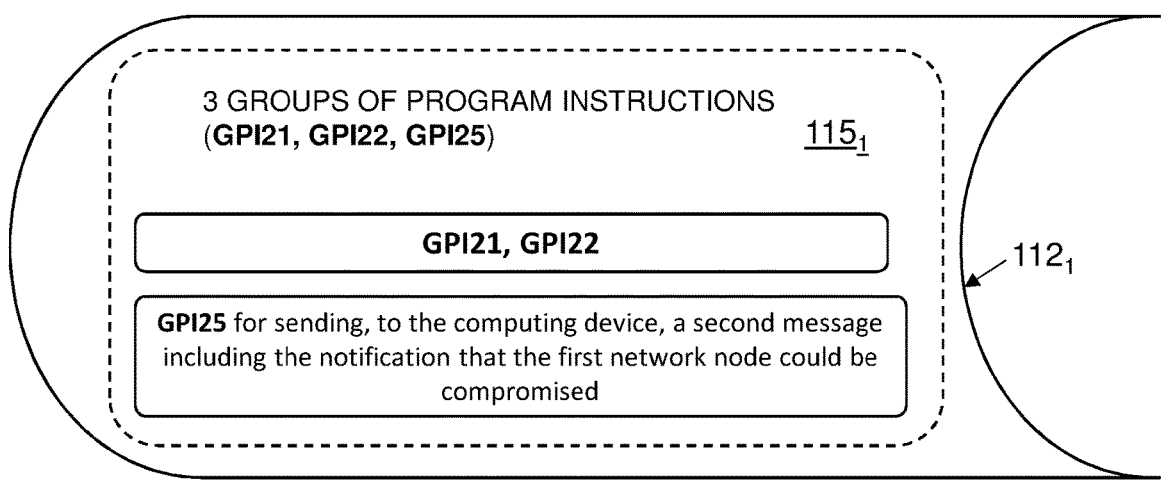

Program Instructions GPI32 for sending a message including a notification that the first network node $110_1$ could be compromised by the attacker of the penetration testing campaign In some embodiments, the sending of the message including the notification that the first network node $110_1$ could be compromised (See GPI32) includes sending the message including the notification to the first network node $110_1$, and the first instructions $115_1$ stored in first reconnaissance-agent non-transitory computer-readable storage medium $112_1$ comprise an additional group of program instructions GPI25, as illustrated in FIG. 8D, for execution by the one or more processors $240_1$ of the first network node $110_1$:

Program Instructions GPI25 for sending, to the computing device 254, a second message including the notification that the first network node $110_1$ could be compromised.

Figure 8E:
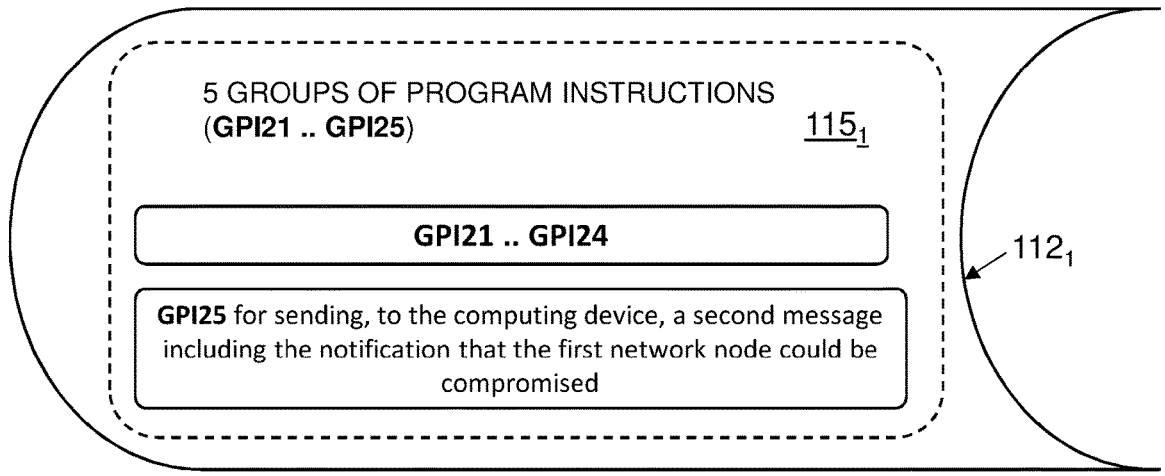

In some embodiments, the first instructions $115_1$ stored in first reconnaissance-agent non-transitory computer-readable storage medium $112_1$, comprise all 5 groups of programs instructions described above, GPI21 . . . GPI25, as illustrated in FIG. 8E.

In some embodiments, the sending of the message including the notification that the first network node $110_1$ could be compromised (See GPI32) includes sending the message including the notification directly to the computing device.

Figure 9:
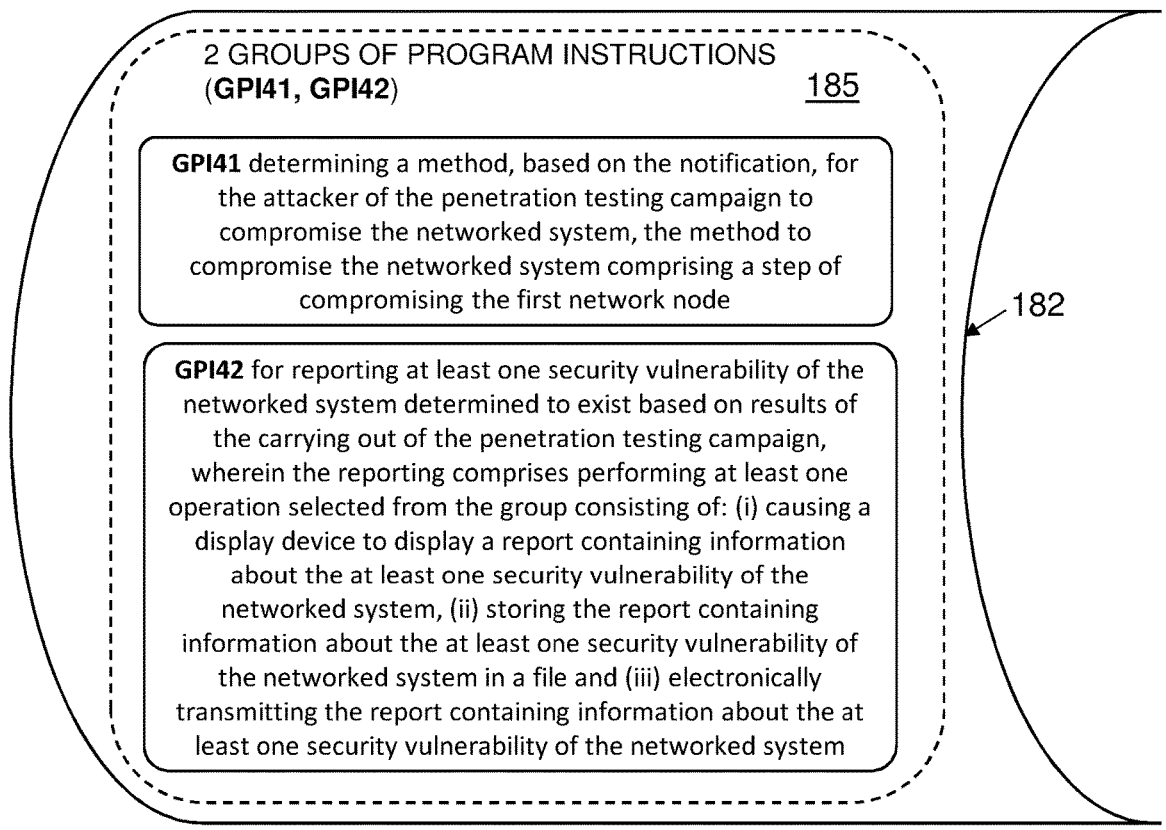
FIG. 9 shows a block diagram of a non-transitory computer-readable storage medium installed at the computing device of FIG. 7, comprising groups of program instructions, according to embodiments of the present invention.

4. A penetration-testing non-transitory computer-readable storage medium 182 for storage of instructions 185 of the penetration testing software module (PTSM) 260 for execution by one or more processors 250 of the remote computing device 254. The penetration testing software module 260 is installed in the computing device 254. The storage medium 182 is also shown for convenience as being part of the computing device 254 but it can be anywhere as long as the one or more processors 250 can access and execute the instructions 185 stored therein. The PTSM 260 can be stored, at least in part, in storage medium 182. As illustrated in the block diagram of FIG. 9, the program instructions 185 comprise 2 groups of program instructions GPI41, GPI42 for execution by the one or more processors 250 of the computing device 254:

Program Instructions GPI41 for determining, based on the notification that the first network node $110_1$ could be compromised by the attacker of the penetration testing campaign, a method for the attacker of the penetration testing campaign to compromise the networked system $200_3$, the method to compromise the networked system comprising a step of compromising the first network node $110_1$.

Program Instructions GPI42 for reporting at least one security vulnerability of the networked system $200_3$ determined to exist based on results of the carrying out of the penetration testing campaign, wherein the reporting comprises performing at least one operation selected from the group consisting of: (i) causing a display device to display a report containing information about the at least one security vulnerability of the networked system $200_3$, (ii) storing the report containing information about the at least one security vulnerability of the networked system $200_3$ in a file and (iii) electronically transmitting the report containing information about the at least one security vulnerability of the networked system $200_3$.

Figure 10A:
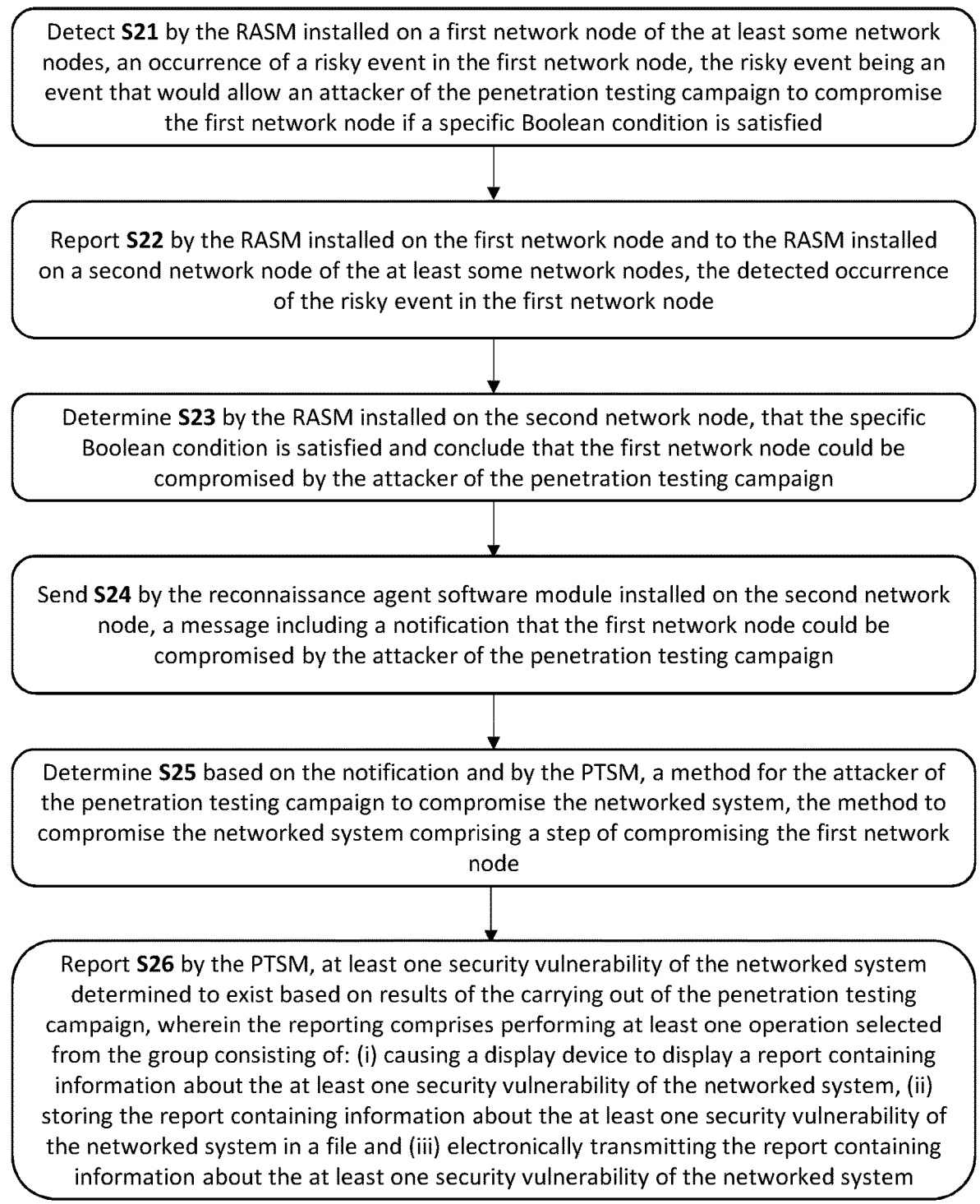
FIGS. 10A-10D show flowcharts of methods of carrying out a penetration testing campaign of a networked system by a simulative penetration testing system, according to embodiments of the present invention.

Referring now to FIG. 10A, a method is disclosed for carrying out a penetration testing campaign of a networked system 200 (for example, networked system $200_3$ of FIG. 7) by a simulative penetration testing system 100. A non-limiting example of a penetration testing system suitable for carrying out the method is one that comprises (A) a penetration testing software module (PTSM) 260 installed on a remote computing device 254 and (B) a reconnaissance agent software module (RASM) 120 installed on at least a first network node $110_1$ and a second network node $110_2$ of the networked system. As illustrated by the flow chart in FIG. 10A, the method comprises:

Step S21 detecting, by the RASM $120_1$ installed on the first network node $110_1$, an occurrence of a risky event in the first network node, the risky event being an event that would allow an attacker of the penetration testing campaign to compromise the first network node if a specific Boolean condition is satisfied. In some embodiments, the risky event includes an execution of an executable file retrieved from a shared folder. In some embodiments, the risky event includes a transmission of a network message of a given type. In some embodiments, the risky event includes an insertion of a removable storage device into a connector of the first network node $110_1$.

Step S22 reporting, by the RASM $120_1$ installed on the first network node 110 and to the RASM installed on a second network node $110_2$, the detected occurrence of the risky event in the first network node $110_1$. In some embodiments, the reporting of the detected occurrence of the risky event in the first network node $110_1$ is sent in a message that is addressed only to the second network node $110_2$. In some embodiments, the reporting of the detected occurrence of the risky event in the first network node $110_1$ is sent in a broadcast message that is addressed to all network nodes 110 sharing a broadcast domain with the first network node $110_1$. In some embodiments, the reporting of the detected occurrence of the risky event in the first network node is done in response to the detecting of the risky event.

Step S23 determining, by the RASM $120_2$ installed on the second network node $110_2$, that the specific Boolean condition is satisfied and concluding that the first network node could be compromised by the attacker of the penetration testing campaign. In some embodiments, a necessary condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$. In some embodiments, a necessary and sufficient condition for the specific Boolean condition to be satisfied is that there is a network node 110 of the multiple network nodes 110, different from the first network node $110_1$, that is already known to be compromisable by the attacker of the penetration testing campaign and that can communicate with the first network node $110_1$. In some embodiments, the determining that the specific Boolean condition is satisfied, is based on whether the second network node $110_2$ is already known to be compromisable by the attacker of the penetration testing campaign. In some embodiments, the determining that the specific Boolean condition is satisfied, is based on whether the second network node $110_2$ has write access rights to a given shared folder. In some embodiments, the determining that the specific Boolean condition is satisfied, is based on whether a given removable storage device had been inserted into the second network node $110_2$ during the penetration testing campaign. In some embodiments, the determining that the specific Boolean condition is satisfied, is based only on information locally available in the second network node $110_2$ at the time of receiving, in the second network node $110_2$, a message reporting the occurrence of the risky event in the first network node $110_1$. In some such embodiments, the information locally available in the second network node $110_2$ at the time of receiving the message reporting the occurrence of the risky event in the first network node $110_1$ includes information about whether the second network node $110_2$ is already known to be compromisable by the attacker of the penetration testing campaign. In some embodiments, the determining that the specific Boolean condition is satisfied, is based on information received in the second network node $110_2$ from another computing device subsequent to the time of receiving, in the second network node $110_2$, a message reporting the occurrence of the risky event in the first network node $110_1$. In some such embodiments, the other computing device is the computing device 254.

Figure 10B:
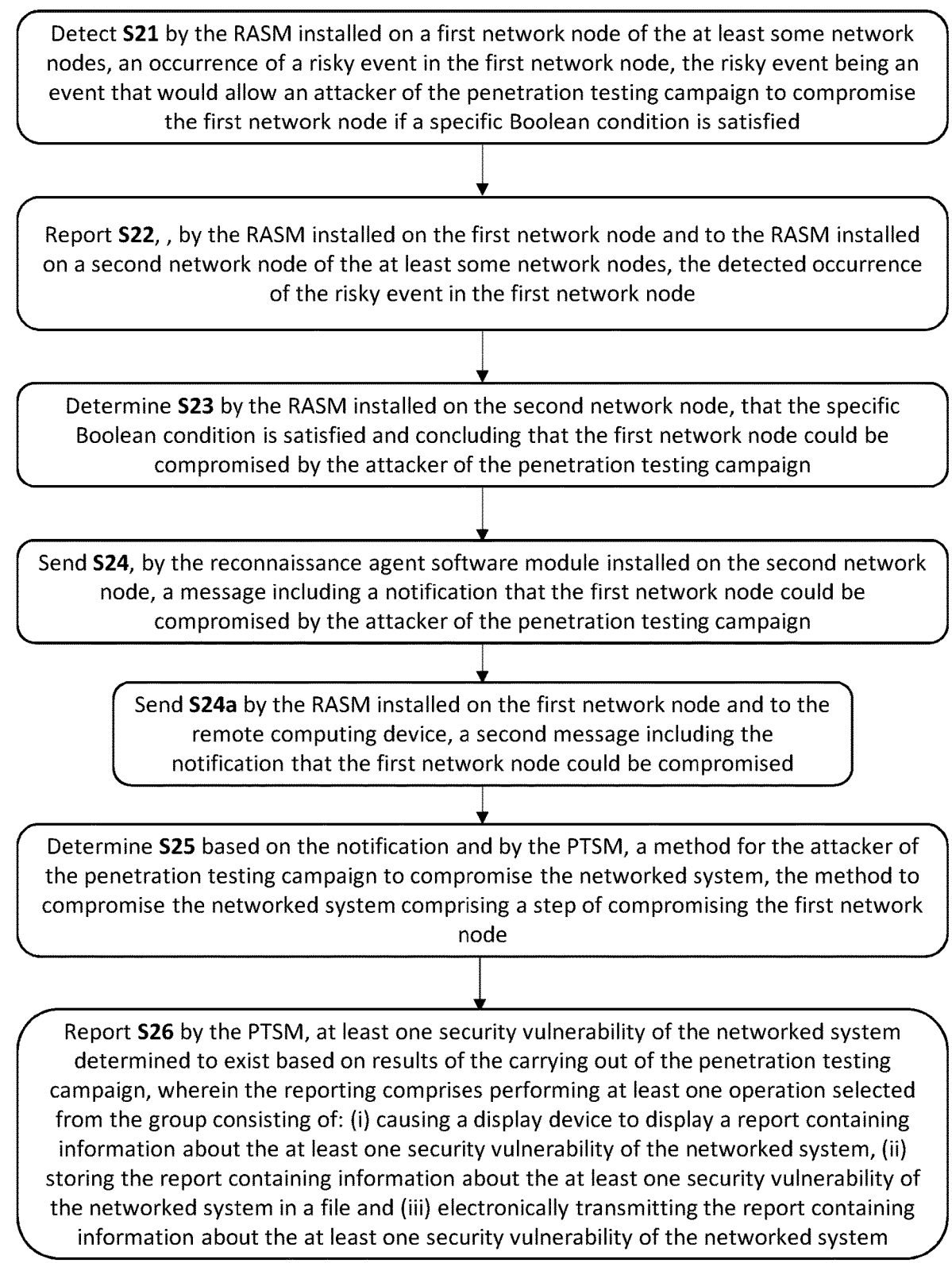

Step S24 sending, by the reconnaissance agent software module $120_2$ installed on the second network node $110_2$, a message including a notification that the first network node could be compromised by the attacker of the penetration testing campaign. In some embodiments, the sending of the message including the notification that the first network node $110_1$ could be compromised includes sending the message including the notification to the first network node $110_1$, and the method additionally comprises, as shown in the flowchart of FIG. 10B:

Step S24a sending, by the RASM $120_1$ installed on the first network node $110_1$ and to the remote computing device, a second message including the notification that the first network node could be compromised.

Step S25 based on the notification, determining, by the PTSM 260, a method for the attacker of the penetration testing campaign to compromise the networked system, the method to compromise the networked system comprising a step of compromising the first network node.

Step S26 reporting, by the PTSM 260, at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system 200, (ii) storing the report containing information about the at least one security vulnerability of the networked system 200 in a file and (iii) electronically transmitting the report containing information about the at least one security vulnerability of the networked system 200.

Figure 10C:
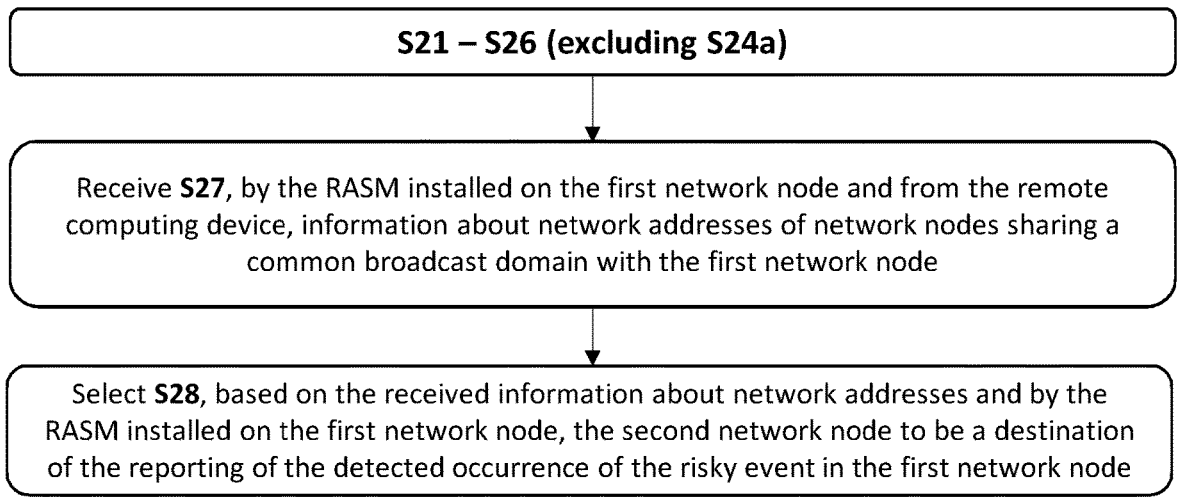

In some embodiments, as shown in the flowchart of FIG. 10C, the method additionally comprises:

Step S27 receiving, by the RASM $120_1$ installed on the first network node $110_1$ and from the remote computing device 254, information about network addresses of network nodes 110 sharing a common broadcast domain with the first network node $110_1$.

Step S28 based on the received information about network addresses, selecting, by the RASM $120_1$ installed on the first network node $110_1$, the second network node $120_2$ to be a destination of the reporting of the detected occurrence of the risky event in the first network node $110_1$.

Figure 10D:
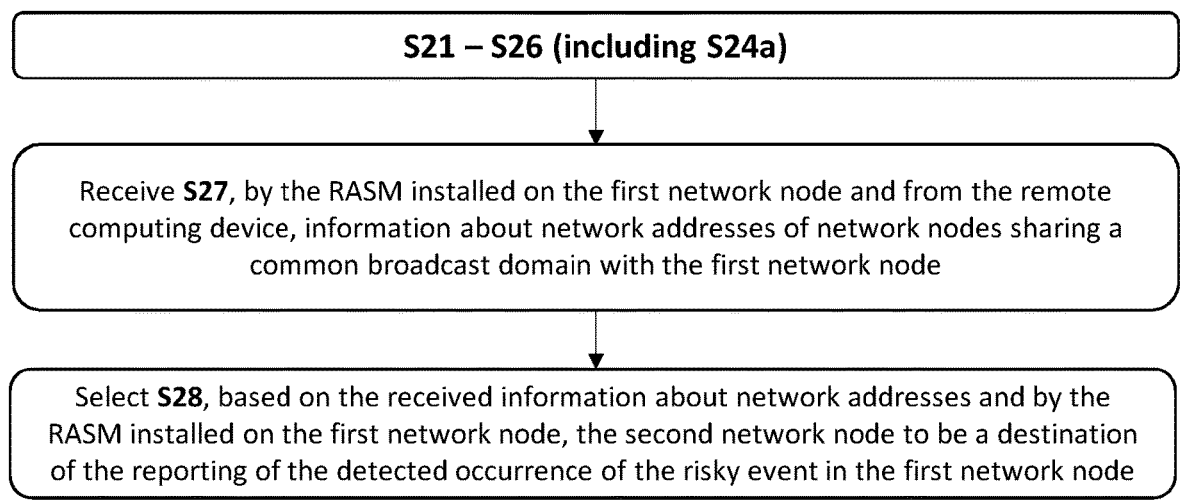

In some embodiments, as shown in FIG. 10D, the method includes all of the above-mentioned steps, i.e., Steps S21-S24, S24a, S25-S28.

Figure 11:
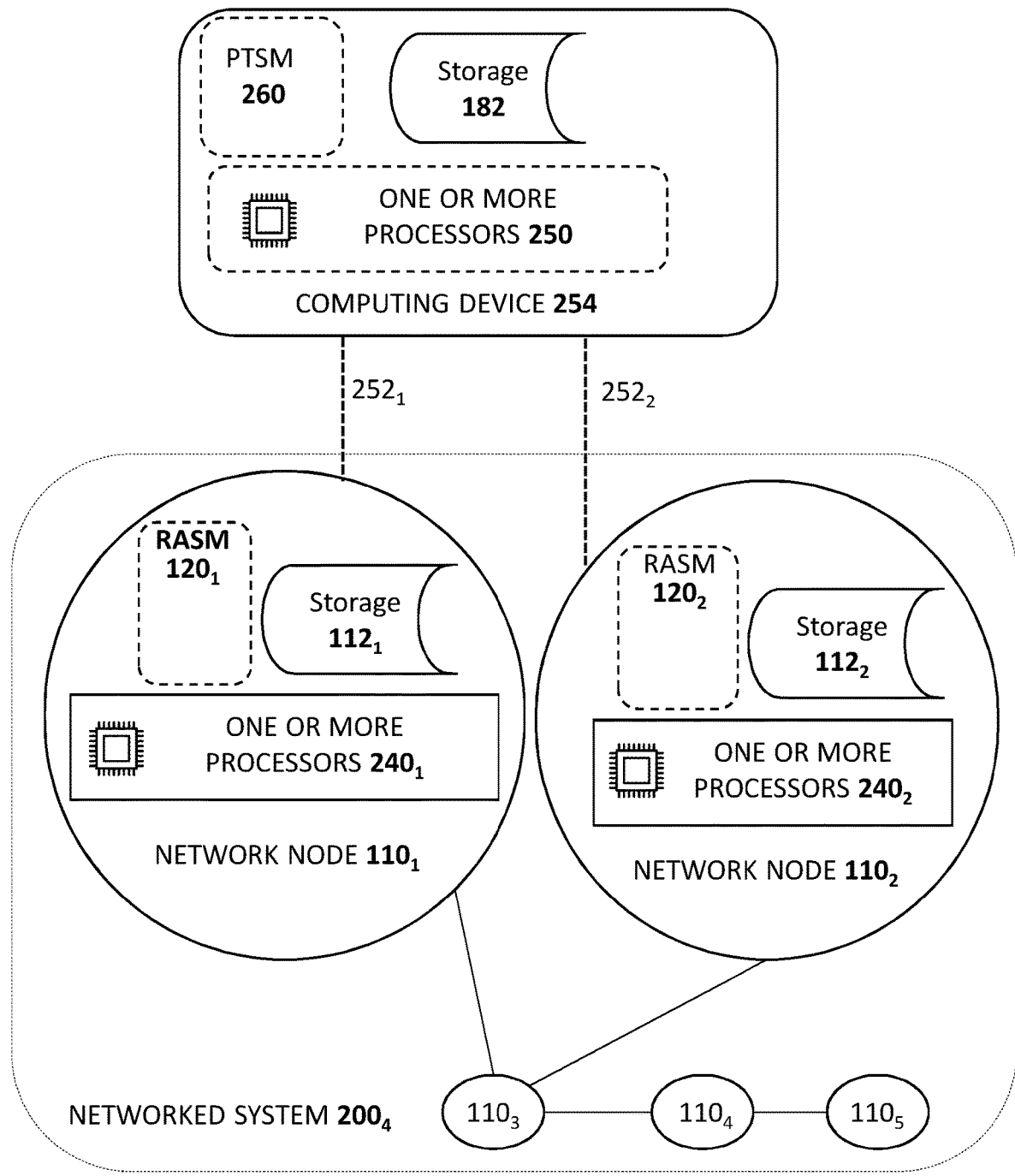
FIG. 11 shows a block diagram of a networked system having first and second network nodes each of which has a reconnaissance agent software module installed therein, and a computing device having a penetration testing software module installed therein and in connection with the networked system, according to embodiments of the present invention.

Networked system $200_4$ of FIG. 11 is similar to networked system $200_3$ of FIG. 7 and includes a plurality of network nodes 110. Five nodes 110 ($110_1$, $110_2$, $110_3$, $110_4$ and $110_5$) are shown, but the networked system $200_4$ can include any number of nodes 110. The nodes 110 may be connected by a single network, but in some embodiments at least some of the nodes and respective connections can form sub-networks, so that the networked system $200_4$ is composed of multiple sub-networks that are in communication with each other. For example, nodes $110_3$, $110_2$ and $110_1$ may be a separate sub-network, with node $110_3$ being a gateway or a router for connecting to another sub-network. Reconnaissance agent software module (RASM) $120_1$ is installed in the first network node $110_1$. As disclosed earlier, the RASM 120 can be installed in any or all of the network nodes 110. The RASM 120, or at least some program instructions thereof, can be stored in respective storage media 112 of corresponding network nodes 110.

Figure 12A:
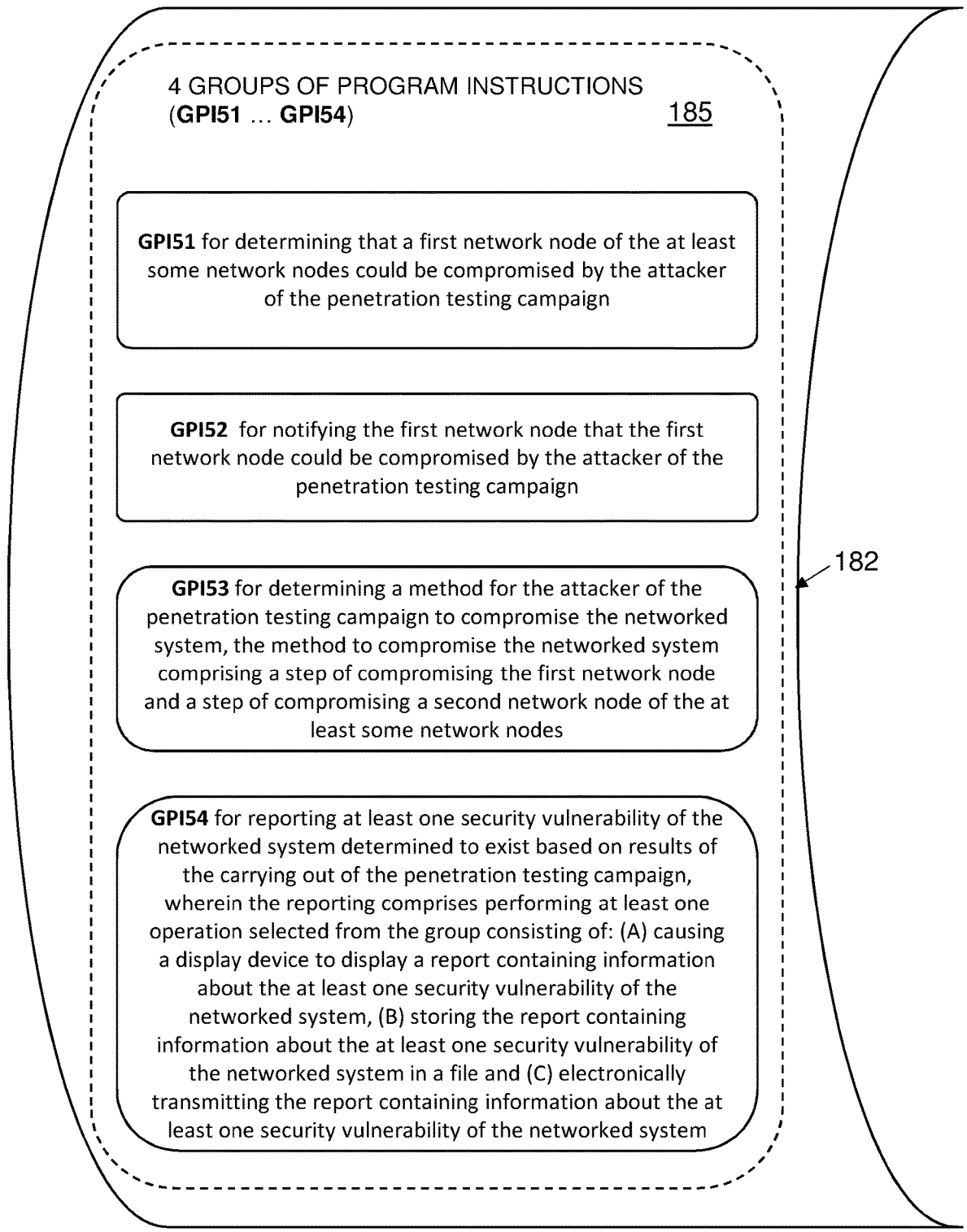
FIG. 12A shows a block diagram of a non-transitory computer-readable storage medium installed at the computing device of FIG. 11, comprising groups of program instructions, according to embodiments of the present invention.

Components of a penetration testing system, along with other hardware and software components related to the execution of a penetration testing campaign by a penetration testing system, are illustrated in FIG. 11. The penetration testing system comprises:

1. A computing device 254 comprising one or more processors 250, the computing device 254 in networked communication with at least some of the multiple network nodes 110 of the networked system $200_4$.
2. A penetration-testing non-transitory computer-readable storage medium 182 for storage of instructions 185 of the penetration testing software module (PTSM) 260 for execution by one or more processors 250 of the remote computing device 254. The penetration testing software module 260 is installed in the computing device 254. The storage medium 182 is also shown for convenience as being part of the computing device 254 but it can be anywhere as long as the one or more processors 250 can access and execute the instructions 185 stored therein. The PTSM 260 can be stored, at least in part, in storage medium 182. As illustrated in the block diagram of FIG. 12A, the program instructions 185 comprise 4 groups of program instructions GPI51 . . . GPI54 for execution by the one or more processors 250 of the computing device 254:

Program Instructions GPI51 for determining that a first network node $110_1$ of the at least some network nodes 110 could be compromised by the attacker of the penetration testing campaign.
    Program Instructions GPI52 for notifying the first network node $110_1$ that the first network node $110_1$ could be compromised by the attacker of the penetration testing campaign.
    Program Instructions GPI53 for determining a method for the attacker of the penetration testing campaign to compromise the networked system $200_4$, the method to compromise the networked system $200_4$ comprising a step of compromising the first network node $110_1$ and a step of compromising a second network node $110_2$ of the at least some network nodes 110.
    Program Instructions GPI54 for reporting at least one security vulnerability of the networked system $200_4$ determined to exist based on results of the carrying out of the penetration testing campaign, wherein the reporting comprises performing at least one operation selected from the group consisting of: (A) causing a display device to display a report containing information about the at least one security vulnerability of the networked system $200_4$, (B) storing the report containing information about the at least one security vulnerability of the networked system in a file and (C) electronically transmitting the report containing information about the at least one security vulnerability of the networked system $200_4$.

Figure 12B:
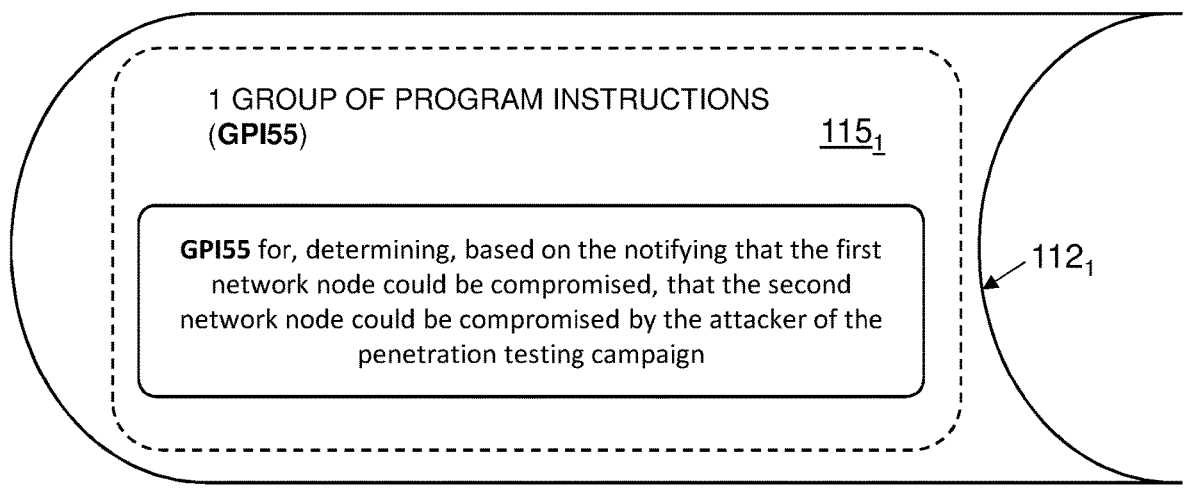
FIGS. 12B and 12C are, respectively, block diagrams of first and second non-transitory computer-readable storage media installed at the first and second network nodes of FIG. 11, comprising respective program instructions, according to embodiments of the present invention.

3. A first reconnaissance-agent non-transitory computer-readable storage medium $112_1$ which is associated with the first node $110_1$. This first storage medium $112_1$ is provided for storage of first instructions $115_1$ of the reconnaissance agent software module for execution by one or more processors $240_1$ of the first network node $110_1$, which is in electronic communication with the computing device 254 (by communications arrangement $252_1$ which can be an Internet connection or a LAN connection or any other suitable connection, including an indirect connection). The computing device 254 can be a remote computer as shown, or can be a computer selected from among the nodes 110 of the networked system $200_4$. A reconnaissance agent software module (RASM) $120_1$ is installed in the network node $110_1$. The first storage medium $112_1$ is shown for convenience as being part of the network node $110_1$ but it can be anywhere as long as the one or more processors $240_1$ can access and execute the instructions $115_1$ stored therein. As shown in the block diagram of FIG. 12B, the first instructions $115_1$ stored in first reconnaissance-agent non-transitory computer-readable storage medium $112_1$, comprise the group of program instructions GPI55 for execution by the one or more processors $240_1$ of the network node $110_1$:

Program Instructions GPI55 for determining, based on the notifying that the first network node $110_1$ could be compromised, that the second network node $110_2$ could be compromised by the attacker of the penetration testing campaign.

Figure 12C:
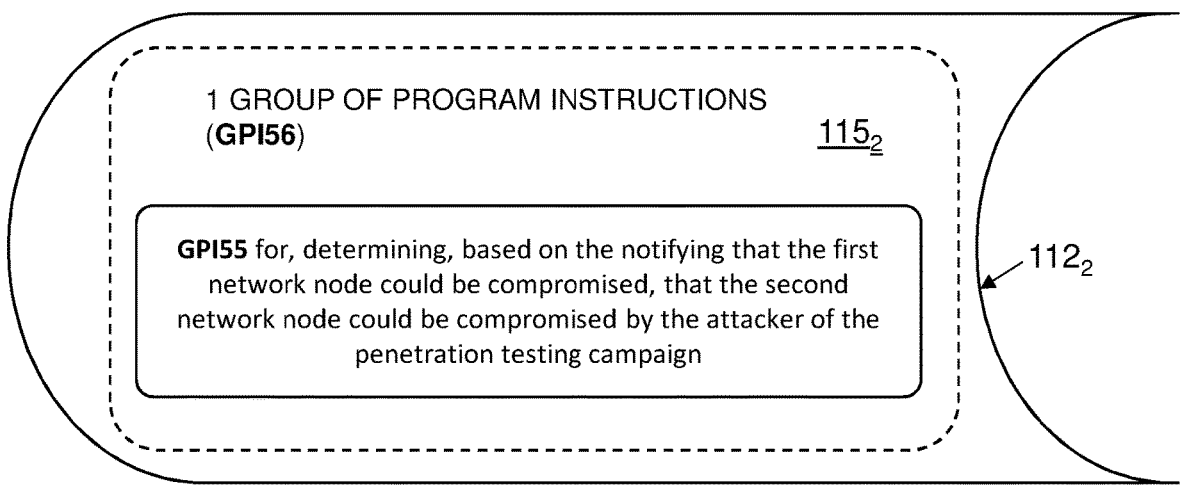

In some embodiments, the penetration testing system can comprise a second reconnaissance-agent non-transitory computer-readable storage medium $112_2$ which is associated with the second node $110_2$ as shown in FIG. 11. In such embodiments, this second reconnaissance-agent storage medium $112_2$ can be provided for storage of second instructions $115_2$ of the reconnaissance agent software module for execution by one or more processors $240_2$ of the second network node $110_2$. A reconnaissance agent software module (RASM) $120_2$ can be installed in the network node $110_2$. As shown in the block diagram of FIG. 12C, the second instructions $115_2$ stored in second reconnaissance-agent non-transitory computer-readable storage medium $112_2$, comprise the group of program instructions GPI56 for execution by the one or more processors $240_2$ of the network node $110_2$:

Program Instructions GPI56 for determining, based on the notifying that the first network node $110_1$ could be compromised, that the second network node $110_2$ could be compromised by the attacker of the penetration testing campaign.

Program Instructions GPI56 are similar to Program Instructions GPI55 except that Program Instructions GPI55 are for execution by the one or more processors $240_1$ of the first node $110_1$ and Program Instructions GPI56 are for execution by the one or more processors $240_2$ of the second node $110_2$.

Figure 13:
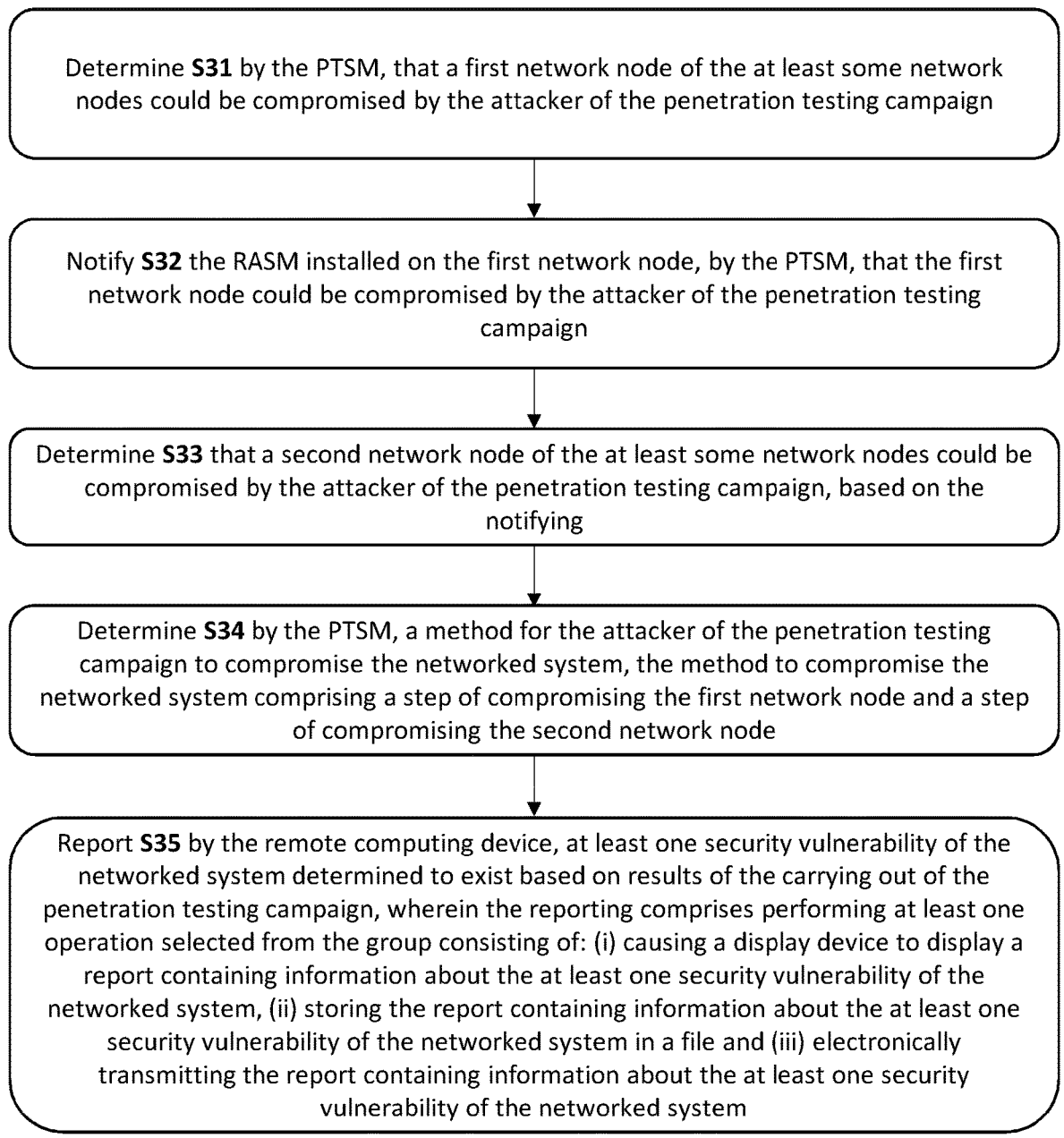
FIG. 13 shows a flowchart of a method of carrying out a penetration testing campaign of a networked system by a simulative penetration testing system, according to embodiments of the present invention.

Referring now to FIG. 13, a method is disclosed for carrying out a penetration testing campaign of a networked system 200 (for example, networked system $200_4$ of FIG. 11) by a simulative penetration testing system 100. A non-limiting example of a penetration testing system suitable for carrying out the method is one that comprises (A) a penetration testing software module (PTSM) 260 installed on a remote computing device 254 and (B) a reconnaissance agent software module (RASM) 120 installed on at least a first network node $110_1$ and a second network node $110_2$ of the networked system. As illustrated by the flow chart in FIG. 13, the method comprises:

Step S31 determining, by the PTSM 260, that a first network node $110_1$ of the at least some network nodes 110 could be compromised by the attacker of the penetration testing campaign.

Step S32 notifying the RASM $120_1$ installed on the first network node $110_1$, by the PTSM 260, that the first network node $110_1$ could be compromised by the attacker of the penetration testing campaign.

Step S33 based on the notifying, determining that a second network node $110_2$ of the at least some network nodes 110 could be compromised by the attacker of the penetration testing campaign. In some embodiments, the determining that the second network node could be compromised by the attacker of the penetration testing campaign is done by the RASM installed on the second network node $110_2$. In some embodiments, the determining that the second network node could be compromised by the attacker of the penetration testing campaign is done by the RASM installed on the first network node $110_1$.

Step S34 determining, by the PTSM 260, a method for the attacker of the penetration testing campaign to compromise the networked system $200_4$, the method to compromise the networked system comprising a step of compromising the first network node $110_1$ and a step of compromising the second network node $110_2$.

Step S35 reporting, by the remote computing device 254, at least one security vulnerability of the networked system $200_4$ determined to exist based on results of the carrying out of the penetration testing campaign, wherein the reporting comprises performing at least one operation selected from the group consisting of: (i) causing a display device to display a report containing information about the at least one security vulnerability of the networked system $200_4$, (ii) storing the report containing information about the at least one security vulnerability of the networked system in a file and (iii) electronically transmitting the report containing information about the at least one security vulnerability of the networked system $200_4$.

Definitions

This disclosure should be interpreted according to the definitions below. In case of a contradiction between the definitions in this Definitions section and other sections of this disclosure, this section should prevail. In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks.

The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.
11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.
13. "penetration testing system"—A system capable of performing penetration testing, regardless if composed of hardware, software or combination of both.
14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

22. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing.

A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

23. "attacker" or "threat actor"—An entity, whether a single person, a group of persons or an organization, that might conduct an attack against a networked system by penetrating it for uncovering its security vulnerabilities and/or for compromising it.

24. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

25. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

26. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

27. "a lateral movement strategy of an attacker"—A decision logic applied by the attacker of a campaign for selecting the next network node to try to compromise.

During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is (i) either an immediate neighbor of or reachable from the last network node that was compromised, and (ii) is not yet compromised (provided such neighbor node exists).

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource and picking the first node on this path to be the next node to try to compromise. Note that if the shortest path has a length of one (which happens when the specific node is an immediate neighbor of an already compromised node), then the next node to try to compromise is the specific node containing the desired resource.

Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also either an immediate neighbor of or reachable from an already compromised node (if such node exists).

Typically, an attacker uses a single lateral movement strategy during an attack.

28. "network nodes A and B are immediate neighbors of each other"—Network nodes A and B have a direct communication link between them that does not pass through any other network node.

29. "network node A can communicate with network node B" or "network node B is reachable from network node A"—Network node A can send information (e.g. commands and/or data) to network node B. The sent information may be passed directly between the two network nodes without passing through any other network node, or it may be passed through one or more other nodes.

The communication channel between the two network nodes may be a two-way communication channel, with which each of the two network nodes can send information to the other one. Alternatively, the communication channel may be a one-way communication channel, enabling network node A to send information to network node B, but not the other way around.

30. "penetration testing by simulation" or "simulated penetration testing"-Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

31. "penetration testing by actual attack" or "actual attack penetration testing" or "penetration testing by actual exploit" or "actual exploit penetration testing"-Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

32. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

33. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

34. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

35. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.

The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

36. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

37. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

38. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

39. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

40. "resource of a network node"—A file in the network node, a folder in the network node, credentials of a user residing in the network node (the credentials not necessarily applying to the network node containing the credentials), a peripheral device of the network node or a communication device accessible to the network node.

41. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

42. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

Access rights may be conditioned on the user authenticating himself before getting the rights to perform the relevant operations. A user is said to have certain access rights regardless if those rights are conditioned on authentication or not.

The term "access rights" in the plural may be used even if only a single right is involved (e.g. when a user has only a right to read a single file in the network node).

43. "user credentials"—An attestation issued to the user for authenticating himself in order to be allowed to use access rights granted to him in one or more network nodes. User credentials may include a user name, a user ID, a password, any combination of the three, or any other data item which is expected not to be available to other people.

44. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

45. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

46. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

47. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

48. "session-hijacking attack"—a cyber-attack where a valid communication session between two network nodes in a networked system is used by an attacker to gain unauthorized access to information or services in the networked computer system.

49. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

50. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

51. "administrator of a network node"—Any person that is authorized, among other things, to define or change at least one rule controlling at least one of an access right, a permission, a priority and a configuration in the network node.

52. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

53. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

54. "a risky event in a network node"—An event occurring in the network node that would allow an attacker to compromise the network node if a specific Boolean condition is satisfied.

Examples for risky events are (i) an insertion of a given removable storage device into a connector of the network node, (ii) a repeated execution by the network node of an executable file retrieved from a given shared folder (e.g. the third execution of the given executable file), and (iii) sending an ARP request message by the network node. The specific Boolean conditions corresponding to the above risky event examples are (i) whether the given removable storage device was previously inserted into another network node that was under control of the attacker at the time of the previous insertion, (ii) whether there is another network node having write access rights to the given shared folder that is under control of the attacker, and (iii) whether there is another network node, residing in the same broadcast domain as the network node, that is under control of the attacker. For each of the above examples, an occurrence of the risky event when the corresponding Boolean condition is satisfied, would allow an attacker to compromise the network node.

55. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

56. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

57. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

58. "executable file"—A computer file that contains instructions that may be executed by a computer. An executable file may be a binary file (e.g. when containing machine code) or a text file (e.g. when containing interpreted scripting code).

59. "text file"—A computer file that includes mostly text. A text file may include some non-textual content. For example, Microsoft Word files may include some non-textual control characters or metadata but are still considered text files.

60. "binary file"—Any computer file that is not a text file. A binary file may include some textual content. For example, executable files containing machine code may include textual strings that are part of the executable code but are still considered binary files.

61. "opening a file"—If the file is an executable file, then opening it means executing it. If the file is not an executable file, then opening it means creating by the operating system at least one data structure associated with the file, the one or more data structures used for enabling a software application to read or write data from/to the file.

62. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

63. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

64. "random selection"—A selection that depends on a random or pseudo-random factor. Different possible outcomes in a random selection do not necessarily have the same probabilities of being selected.

65. "broadcast domain"—A logical division of a networked system, in which all network nodes can reach each other by broadcasting at the data link layer. In other words, each network node in a broadcast domain can transmit a data link broadcast message that is addressed to all other network nodes within its broadcast domain.

66. "data packet", "network packet" or "network message"—A formatted unit of data carried by a computer network.

67. "data packet of a network node"—A data packet that is either sent by the network node or received by the network node.

68. "poisoned file"—A file containing malicious computer code and having the property that opening the file in a computing device may result in automatically executing the malicious code in the computing device, thereby causing compromising of the computing device.

The automatic executing of malicious computer code when opening a poisoned file in a computing device may depend on the software application used by the computing device for opening the poisoned file. It is possible that opening the file with a first software application will cause compromising of the computing device, while opening the file with a second software application will not result in compromising the computing device. A file containing malicious computer code whose file type is supported by multiple software applications, some causing compromising and some not, is a poisoned file in spite of the fact that poisoning of the computing device in which it is opened is not guaranteed, as long as there exists at least one software application that supports the file type and whose use for opening the file results in compromising the computing device in which it is opened.

69. "a Boolean condition"—A statement that can have a value of either true or false. If the statement is true, we say that the Boolean condition is satisfied. If the statement is false, we say that the Boolean condition is not satisfied.

70. "a variable"—An entity whose value can change with time and consequently is not always the same, or that is currently unknown at a certain location even if it cannot change. A variable may be a numerical variable or a Boolean variable.

71. "a numerical variable"—A variable whose value is limited to numbers (i.e. the value may not be textual or any other non-numeric form). The value of a numerical variable may be limited to a proper subset of the set of all numbers. For example, limited only to integer numbers, limited only to positive numbers, limited only to rational numbers, limited only to numbers in the range [4.5 . . . 9.7] or limited only to integer numbers in the range [4.5 . . . 9.5].

72. "a Boolean variable"—A variable whose value is limited to be either "true" or "false".

73. "a state of a variable"—the current value of the variable. For a numerical variable the state is number and for a Boolean variable the state is either "true" or "false".

74. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

75. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

76. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

77. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A method of carrying out, by a simulative penetration testing system, a penetration testing campaign of a networked system, the networked system including multiple network nodes, the penetration testing system comprising (A) a penetration testing software module (PTSM) installed on a remote computing device and (B) a reconnaissance agent software module (RASM) installed on at least some network nodes of the multiple network nodes, the method comprising:
   a. detecting, by the RASM installed on a first network node of the at least some network nodes, an occurrence of a risky event in the first network node, the risky event being an event that would allow an attacker of the penetration testing campaign to compromise the first network node if a specific Boolean condition is satisfied;
   b. sending, by the RASM installed on the first network node, one or more queries to a second network node of the at least some network nodes, the one or more queries requesting information that is relevant for determining a value of the specific Boolean condition;
   c. receiving, by the RASM installed on the first network node and from the RASM installed on the second network node, one or more answers to the one or more queries, the one or more answers including at least one or more portions of the requested information;
   d. based on the received at least one or more portions of the requested information, determining, by the RASM installed on the first network node, that the specific Boolean condition is satisfied and concluding that the first network node is vulnerable to attack by the attacker of the penetration testing campaign;
   e. sending, by the RASM installed on the first network node, a message to the remote computing device, the message notifying the remote computing device that the first network node is vulnerable to attack by the attacker of the penetration testing campaign;
   f. determining, by the PTSM, a method for the attacker of the penetration testing campaign to compromise the networked system, the method to compromise the networked system comprising a step of compromising the first network node; and
   g. reporting, by the PTSM, at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

2. The method of claim 1, wherein:
   i. the requested information that is relevant for determining the value of the specific Boolean condition includes information about the respective value of each of one or more variables, where each of the one or more variables is a Boolean variable or a numerical variable;
   ii. the received at least one or more portions of the requested information includes the respective values of at least some of the one or more variables; and
   iii. the determining that the specific Boolean condition is satisfied is based on the received respective values of the at least some of the one or more variables.

3. The method of claim 1, wherein a necessary condition for the specific Boolean condition to be satisfied is that there is a network node of the multiple network nodes, different from the first network node, that is already known to be compromisable by the attacker of the penetration testing campaign and that can communicate with the first network node.

4. The method of claim 2, wherein the one or more variables include a Boolean variable whose value is true if and only if the second network node has write access rights to a given shared folder.

5. The method of claim 2, wherein the one or more variables include a variable whose respective value may change during the penetration testing campaign.

6. The method of claim 2, wherein the one or more variables include a Boolean variable whose value is true if and only if a given removable storage device had been inserted into the second network node during the penetration testing campaign.

7. The method of claim 2, wherein the one or more variables include a numerical variable whose value indicates a count of occurrences of a given event.

8. The method of claim 1, wherein the risky event includes an execution of an executable file retrieved from a shared folder.

9. The method of claim 1, wherein the risky event includes a transmission of a network message of a given type.

10. The method of claim 1, wherein the risky event includes an insertion of a removable storage device into a connector of the first network node.

11. The method of claim 1, wherein the one or more queries are sent only to the second network node.

12. The method of claim 1, wherein the one or more queries are sent to all network nodes sharing a broadcast domain with the first network node.

13. The method of claim 1, wherein at least a part of the at least one or more portions of the requested information is locally determined by the reconnaissance agent software module installed on the second network node without receiving it from another computing device.

14. The method of claim 1, wherein at least a part of the at least one or more portions of the requested information is received, by the reconnaissance agent software module installed on the second network node, from another computing device.

15. A method of carrying out, by a simulative penetration testing system, a penetration testing campaign of a networked system, the networked system including multiple network nodes, the penetration testing system comprising (A) a penetration testing software module (PTSM) installed on a remote computing device and (B) a reconnaissance agent software module (RASM) installed on at least some network nodes of the multiple network nodes, the method comprising:
   a. detecting, by the RASM installed on a first network node of the at least some network nodes, an occurrence of a risky event in the first network node, the risky event being an event that would allow an attacker of the penetration testing campaign to compromise the first network node if a specific Boolean condition is satisfied;
   b. reporting, by the RASM installed on the first network node and to the RASM installed on a second network node of the at least some network nodes, the detected occurrence of the risky event in the first network node;
   c. determining, by the RASM installed on the second network node, that the specific Boolean condition is satisfied and concluding that the first network node is vulnerable to attack by the attacker of the penetration testing campaign;
   d. sending, by the reconnaissance agent software module installed on the second network node, a message including a notification that the first network node is vulnerable to attack by the attacker of the penetration testing campaign;
   e. based on the notification, determining, by the PTSM, a method for the attacker of the penetration testing campaign to compromise the networked system, the method to compromise the networked system comprising a step of compromising the first network node; and
   f. reporting, by the PTSM, at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

16. A method of carrying out, by a simulative penetration testing system, a penetration testing campaign of a networked system including multiple network nodes, the penetration testing system comprising (A) a penetration testing software module (PTSM) installed on a remote computing device and (B) a reconnaissance agent software module (RASM) installed on at least some network nodes of the multiple network nodes, the method comprising:
   a. determining, by the PTSM, that a first network node of the at least some network nodes is vulnerable to attack by the attacker of the penetration testing campaign;
   b. notifying the RASM installed on the first network node, by the PTSM, that the first network node is vulnerable to attack by the attacker of the penetration testing campaign;
   c. based on the notifying, determining that a second network node of the at least some network nodes is vulnerable to attack by the attacker of the penetration testing campaign;
   d. determining, by the PTSM, a method for the attacker of the penetration testing campaign to compromise the networked system, the method to compromise the networked system comprising a step of compromising the first network node and a step of compromising the second network node; and
   e. reporting, by the remote computing device, at least one security vulnerability of the networked system determined to exist based on results of the carrying out of the penetration testing campaign, wherein the reporting comprises performing at least one operation selected from the group consisting of: (i) causing a display device to display a report containing information about the at least one security vulnerability of the networked system, (ii) storing the report containing information about the at least one security vulnerability of the networked system in a file and (iii) electronically transmitting the report containing information about the at least one security vulnerability of the networked system.

17. The method of claim 16, wherein the determining that the second network node is vulnerable to attack by the attacker of the penetration testing campaign is done by the RASM installed on the second network node.

18. The method of claim 16, wherein the determining that the second network node is vulnerable to attack by the attacker of the penetration testing campaign is done by the RASM installed on the first network node.

19. A simulative penetration testing system for carrying out a penetration testing campaign of a networked system for determining a way for an attacker to compromise the networked system, the networked system including multiple network nodes, the penetration testing system comprising:
   a. a computing device comprising one or more processors, the computing device in networked communication with at least some of the multiple network nodes of the networked system;
   b. a first non-transitory computer-readable storage medium having stored therein program instructions, which when executed by one or more processors of a first network node of the multiple network nodes, cause the one or more processors of the first network node to carry out the following steps:
     i. detecting an occurrence of a risky event in the first network node, the risky event being an event that would allow an attacker of the penetration testing campaign to compromise the first network node if a specific Boolean condition is satisfied, ii. sending one or more queries to a second network node of the multiple network nodes, the one or more queries requesting information that is relevant for determining a value of the specific Boolean condition, iii. receiving, from the second network node, one or more answers to the one or more queries, the one or more answers including at least one or more portions of the requested information, iv. based on the received at least one or more portions of the requested information, determining that the specific Boolean condition is satisfied and concluding that the first network node is vulnerable to attack by the attacker of the penetration testing campaign, and v. sending a message to the computing device, the message notifying the computing device that the first network node is vulnerable to attack by the attacker of the penetration testing campaign; and c. a second non-transitory computer-readable storage medium having stored therein program instructions, which when executed by one or more processors of the computing device cause the one or more processors of the computing device to carry out the following steps:

i. determining a method for the attacker of the penetration testing campaign to compromise the networked system, the method to compromise the networked system comprising a step of compromising the first network node; and ii. reporting at least one security vulnerability of the networked system determined to exist based on results of the carrying out of the penetration testing campaign, wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system.

20. A simulative penetration testing system for carrying out a penetration testing campaign of a networked system for determining a way for an attacker to compromise the networked system, the networked system including multiple network nodes, the penetration testing system comprising:

a. a computing device comprising one or more processors, the computing device in networked communication with at least some of the multiple network nodes of the networked system;

b. a first non-transitory computer-readable storage medium having stored therein a first set of program instructions, which when executed by the one or more processors of the computing device, cause the one or more processors of the computing device to carry out the following steps:

i. determining that a first network node of the at least some network nodes is vulnerable to attack by the attacker of the penetration testing campaign;

ii. notifying the first network node that the first network node is vulnerable to attack by the attacker of the penetration testing campaign;

iii. determining a method for the attacker of the penetration testing campaign to compromise the networked system, the method to compromise the networked system comprising a step of compromising the first network node and a step of compromising a second network node of the at least some network nodes; and iv. reporting at least one security vulnerability of the networked system determined to exist based on results of the carrying out of the penetration testing campaign, wherein the reporting comprises performing at least one operation selected from the group consisting of: (A) causing a display device to display a report containing information about the at least one security vulnerability of the networked system, (B) storing the report containing information about the at least one security vulnerability of the networked system in a file and (C) electronically transmitting the report containing information about the at least one security vulnerability of the networked system, and c. a second non-transitory computer-readable storage medium, having stored therein a second set of program instructions, which when executed by one or more processors of the second network node, cause the one or more processors of the second network node to carry out the following step:

i. based on the notifying that the first network node is is vulnerable to attack, determining that the second network node is vulnerable to attack by the attacker of the penetration testing campaign.

* * * * *